(12) United States Patent
Edwards, Jr. et al.

(10) Patent No.: US 11,650,384 B2
(45) Date of Patent: May 16, 2023

(54) THERMAL OPTIMIZATIONS FOR OSFP OPTICAL TRANSCEIVER MODULES

(71) Applicant: Google LLC, Mountain View, CA (US)

(72) Inventors: William F. Edwards, Jr., Livermore, CA (US); Melanie Beauchemin, Mountain View, CA (US); Timothy Conrad Lee, San Mateo, CA (US); Federico Pio Centola, San Jose, CA (US); Madhusudan K. Iyengar, Foster City, CA (US); Michael Chi Kin Lau, Los Altos, CA (US); Zuowei Shen, Los Altos, CA (US); Justin Sishung Lee, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/668,062

(22) Filed: Feb. 9, 2022

(65) Prior Publication Data
US 2022/0269019 A1    Aug. 25, 2022

Related U.S. Application Data

(63) Continuation of application No. 17/122,658, filed on Dec. 15, 2020, now Pat. No. 11,249,264.

(60) Provisional application No. 63/047,410, filed on Jul. 2, 2020.

(51) Int. Cl.
*H04B 10/00* (2013.01)
*G02B 6/42* (2006.01)

(52) U.S. Cl.
CPC .......... *G02B 6/4269* (2013.01); *G02B 6/428* (2013.01); *G02B 6/4284* (2013.01)

(58) Field of Classification Search
CPC combination set(s) only.
See application file for complete search history.

(56) References Cited

U.S. PATENT DOCUMENTS

| | | | |
|---|---|---|---|
| 6,252,726 B1 * | 6/2001 | Verdiell | H01S 5/02208 385/94 |
| 6,349,035 B1 * | 2/2002 | Koenen | H01L 23/473 29/890.03 |
| 6,918,429 B2 * | 7/2005 | Lin | F28D 15/0275 165/185 |
| 6,937,474 B2 * | 8/2005 | Lee | F28D 15/0275 361/679.52 |
| 6,986,679 B1 | 1/2006 | Aronson et al. | |
| 7,019,974 B2 * | 3/2006 | Lee | G06F 1/20 174/15.2 |

(Continued)

FOREIGN PATENT DOCUMENTS

WO    2015094125 A1    6/2015

OTHER PUBLICATIONS

Brian Park, OSFP OCTAL Small Form Factor Pluggable Module, Mar. 14, 2020, 99 pages.

(Continued)

*Primary Examiner* — Agustin Bello
(74) *Attorney, Agent, or Firm* — Lerner David LLP

(57) ABSTRACT

Heat dissipation and electric shielding techniques and apparatuses are disclosed to enable the operation of OSFP modules at higher bandwidths. OSFP compatible techniques are discussed including the use of water cooling, addition of heat pipes, use of intercoolers, air-fins and air-foils, optimization of cooling fins, use of vapor chambers are discussed.

20 Claims, 29 Drawing Sheets

(56) References Cited

U.S. PATENT DOCUMENTS

| | | | |
|---|---|---|---|
| 7,190,577 B2* | 3/2007 | Ali | H01L 23/467 361/679.48 |
| 7,319,588 B2* | 1/2008 | Peng | H01L 23/467 174/15.2 |
| 7,327,576 B2* | 2/2008 | Lee | G06F 1/20 174/15.2 |
| 7,457,126 B2* | 11/2008 | Ahrens | H01L 23/427 257/E23.088 |
| 7,477,515 B2* | 1/2009 | Tsai | H01L 23/427 361/710 |
| 7,511,947 B2* | 3/2009 | Leng | H01L 23/427 361/679.52 |
| 7,515,423 B2* | 4/2009 | Peng | H05K 7/20936 307/146 |
| 7,625,223 B1 | 12/2009 | Fogg | |
| 7,646,615 B2 | 1/2010 | Ice | |
| 7,764,504 B2* | 7/2010 | Phillips | H01R 13/6582 174/15.2 |
| 7,855,891 B1* | 12/2010 | Ayres, III | H05K 7/20445 174/547 |
| 8,083,547 B2 | 12/2011 | Roth et al. | |
| 8,879,267 B2 | 11/2014 | Henry et al. | |
| 9,052,483 B2 | 6/2015 | Nguyen | |
| 9,343,851 B2 | 5/2016 | Bucher et al. | |
| 9,389,368 B1 | 7/2016 | Sharf | |
| 9,518,785 B2* | 12/2016 | Szczesny | G02B 6/4269 |
| 9,696,506 B2 | 7/2017 | Wu et al. | |
| 9,846,287 B2* | 12/2017 | Mack | F28F 1/32 |
| 9,877,413 B2* | 1/2018 | Regnier | G02B 6/4284 |
| 9,935,403 B1 | 4/2018 | Briant et al. | |
| 9,983,370 B1* | 5/2018 | Mahoney | G02B 6/4269 |
| 10,069,248 B2 | 9/2018 | Su et al. | |
| 10,104,760 B1 | 10/2018 | Briant et al. | |
| 10,128,627 B1 | 11/2018 | Kazav et al. | |
| 10,368,464 B2* | 7/2019 | Chen | G02B 6/4269 |
| 10,409,340 B2* | 9/2019 | Jin | H05K 7/2039 |
| 10,455,739 B2* | 10/2019 | Su | H05K 5/03 |
| 10,477,729 B2* | 11/2019 | Han | F28F 3/06 |
| 10,511,118 B2* | 12/2019 | Beltran | H05K 3/00 |
| 10,551,580 B2* | 2/2020 | Regnier | G02B 6/3879 |
| 10,651,607 B1 | 5/2020 | Gawlowski | |
| 10,701,838 B1 | 6/2020 | Conroy et al. | |
| 10,847,929 B2 | 11/2020 | Hamauchi | |
| 10,884,203 B2* | 1/2021 | Chanu | H05K 7/20336 |
| 10,952,355 B1 | 3/2021 | Hocker et al. | |
| 11,026,349 B2* | 6/2021 | Taylor | H05K 5/069 |
| 11,064,633 B2* | 7/2021 | Wang | H01R 13/518 |
| 11,073,336 B2 | 7/2021 | Chen | |
| 11,101,611 B2 | 8/2021 | Winey et al. | |
| 11,109,514 B1* | 8/2021 | Liu | H05K 7/2049 |
| 11,112,572 B2 | 9/2021 | Tittenhofer et al. | |
| 11,249,264 B2* | 2/2022 | Edwards, Jr. | G02B 6/4284 |
| 11,356,542 B2* | 6/2022 | Sathyamurthy | G06F 1/203 |
| 2003/0161108 A1 | 8/2003 | Bright et al. | |
| 2003/0169983 A1* | 9/2003 | Branch | G02B 6/4277 257/E23.114 |
| 2004/0085744 A1 | 5/2004 | Leeson et al. | |
| 2004/0132331 A1* | 7/2004 | Osborn | H01L 23/552 257/E23.114 |
| 2005/0098300 A1* | 5/2005 | Kawabata | F28F 3/02 165/80.3 |
| 2005/0195565 A1 | 9/2005 | Bright | |
| 2006/0067045 A1* | 3/2006 | Ali | F28D 15/0275 257/E23.099 |
| 2006/0291171 A1* | 12/2006 | Ahrens | H01L 23/427 257/E23.088 |
| 2007/0183128 A1 | 8/2007 | Pirillis et al. | |
| 2007/0298537 A1 | 12/2007 | Sung | |
| 2008/0062649 A1* | 3/2008 | Leng | H01L 23/427 257/E23.103 |
| 2008/0137306 A1 | 6/2008 | Kim | |
| 2009/0060425 A1 | 3/2009 | Aronson | |
| 2009/0109627 A1 | 4/2009 | Murr et al. | |
| 2009/0253290 A1 | 10/2009 | Harris | |
| 2009/0277614 A1* | 11/2009 | Lin | F28F 3/02 165/104.26 |
| 2010/0188811 A1* | 7/2010 | Liang | G06F 1/20 361/679.52 |
| 2011/0051373 A1 | 3/2011 | McColloch | |
| 2011/0110048 A1 | 5/2011 | Lima | |
| 2011/0170264 A1* | 7/2011 | Lee | G06F 1/20 361/689 |
| 2013/0128461 A1* | 5/2013 | Nagasawa | F28F 3/02 165/185 |
| 2013/0210269 A1 | 8/2013 | Neer et al. | |
| 2014/0153192 A1 | 6/2014 | Neer et al. | |
| 2014/0302713 A1 | 10/2014 | Su et al. | |
| 2015/0280368 A1 | 10/2015 | Bucher | |
| 2015/0342085 A1 | 11/2015 | McKervey et al. | |
| 2016/0149324 A1 | 5/2016 | Regnier | |
| 2016/0211623 A1 | 7/2016 | Sharf et al. | |
| 2016/0211625 A1* | 7/2016 | Sharf | G02B 6/4284 |
| 2016/0295739 A1* | 10/2016 | Ahamed | F28D 15/046 |
| 2016/0341906 A1 | 11/2016 | Rinzler et al. | |
| 2017/0077643 A1* | 3/2017 | Zbinden | G02B 6/4268 |
| 2017/0168253 A1 | 6/2017 | Wilcox et al. | |
| 2018/0049348 A1 | 2/2018 | Bucher | |
| 2018/0306989 A1 | 10/2018 | Khazen et al. | |
| 2018/0310435 A1 | 10/2018 | Sharf et al. | |
| 2018/0338387 A1 | 11/2018 | Park et al. | |
| 2018/0368283 A1* | 12/2018 | Little | H01R 13/6581 |
| 2019/0013617 A1 | 1/2019 | Ayzenberg et al. | |
| 2019/0044299 A1 | 2/2019 | Kazav et al. | |
| 2019/0115684 A1 | 4/2019 | Khazen et al. | |
| 2019/0116692 A1* | 4/2019 | Little | H01R 13/6581 |
| 2020/0220289 A1 | 7/2020 | Scholeno et al. | |
| 2020/0275587 A1 | 8/2020 | Chopra et al. | |
| 2020/0292769 A1 | 9/2020 | Zbinden | |
| 2021/0084749 A1 | 3/2021 | Devalla et al. | |
| 2021/0098927 A1 | 4/2021 | Si et al. | |
| 2021/0105025 A1* | 4/2021 | Wall, Jr. | H04B 10/116 |
| 2021/0112683 A1* | 4/2021 | Mohajer | G02B 6/4261 |
| 2021/0212193 A1* | 7/2021 | Deng | H05K 7/023 |
| 2021/0263247 A1* | 8/2021 | Bechtolsheim | G02B 6/4284 |
| 2022/0269019 A1* | 8/2022 | Edwards, Jr. | G02B 6/4268 |

OTHER PUBLICATIONS

Brian Park, OSFP OCTAL Small Form Factor Pluggable Module, Jan. 14, 2019, 80 pages.

Brian Park, OSFP OCTAL Small Form Factor Pluggable Module, Aug. 1, 2017, 53 pages.

Brian Park, OSFP OCTAL Small Form Factor Pluggagle Module, Jun. 26, 2017, 53 pages.

Brian Park, OSFP OCTAL Small Form Factor Pluggable Module, Mar. 17, 2017, 53 pages.

Extended European Search Report for European Patent Application No. 21169920.2 dated Feb. 23, 2022. 12 pages.

Extended European Search Report for European Patent Application No. 22157233.2 dated May 27, 2022. 10 pages.

Extended European Search Report for European Patent Application No. 22157236.5 dated May 23, 2022. 11 pages.

Intel Stratix 10 TX Transceiver Signal Integrity Development Kit User Guide. Sep. 27, 2019 (Sep. 27, 2019), 79 pages. Retrieved from the Internet: <https://cdrdv2.intel.com/v1/d1/getCont ent/667130?fileName=ug-intel-s10-tx-devl-k it-683591-667130.pdf>.

Kawano et al. Compact 10 Gbit/s optical transceiver/receiver set with novel cooling structure for 640 Gbit/s WDM interconnection. Electronics Letters, The Institution of Engineering and Technology, GB, vol. 34, No. 19, Sep. 17, 1998 (Sep. 17, 1998), pp. 1876-1877, DOI: 10.1049/EL:19981327.

Sahiti et al. Performance comparison of pin fin in-duct flow arrays with various pin cross-sections. Aug. 1, 2006. Applied Thermal Engineering, vol. 26, No. 11-12, pp. 1176-1192. DOI: 10.1016/J.APPLTHERMALENG.2005.10.042.

* cited by examiner

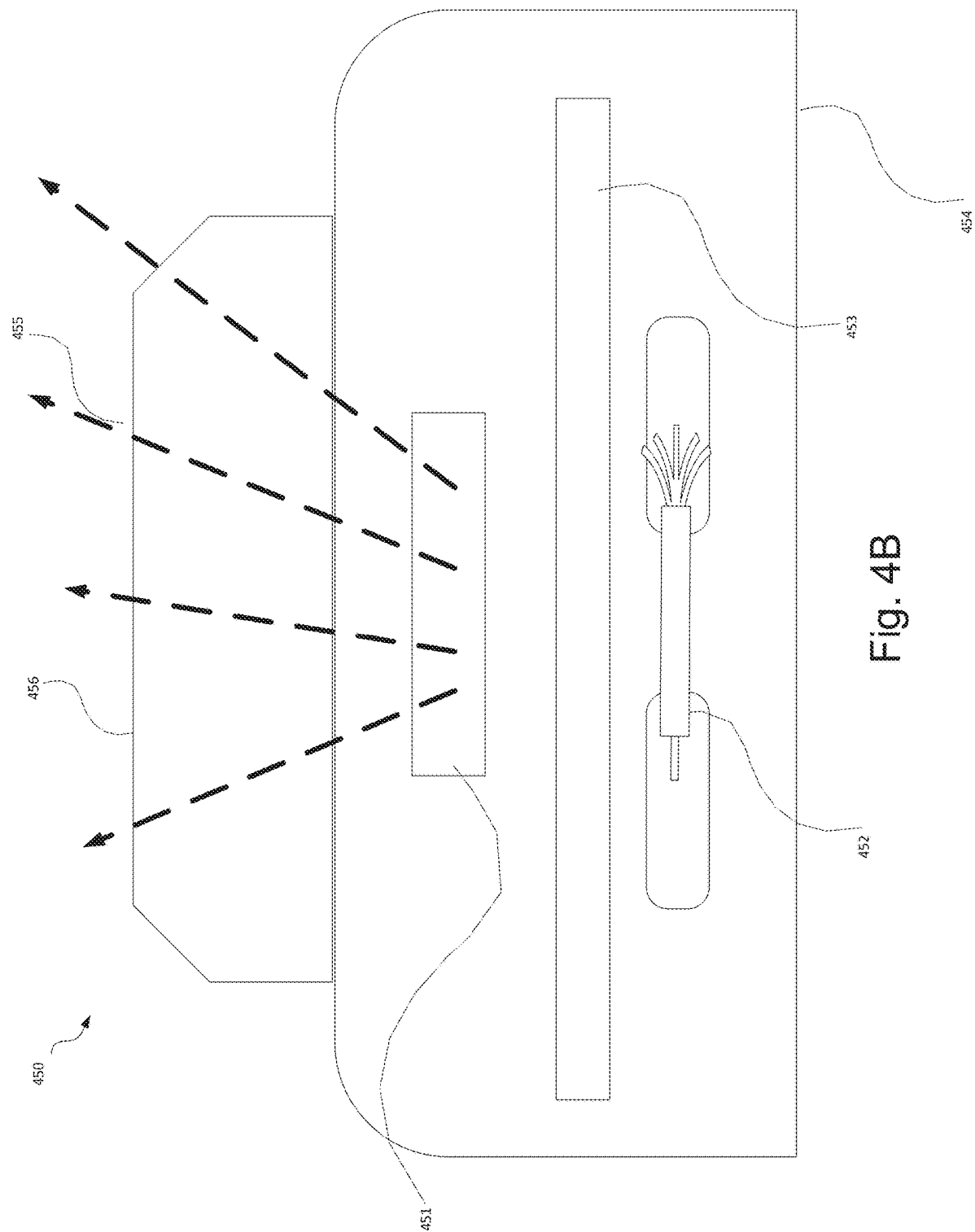

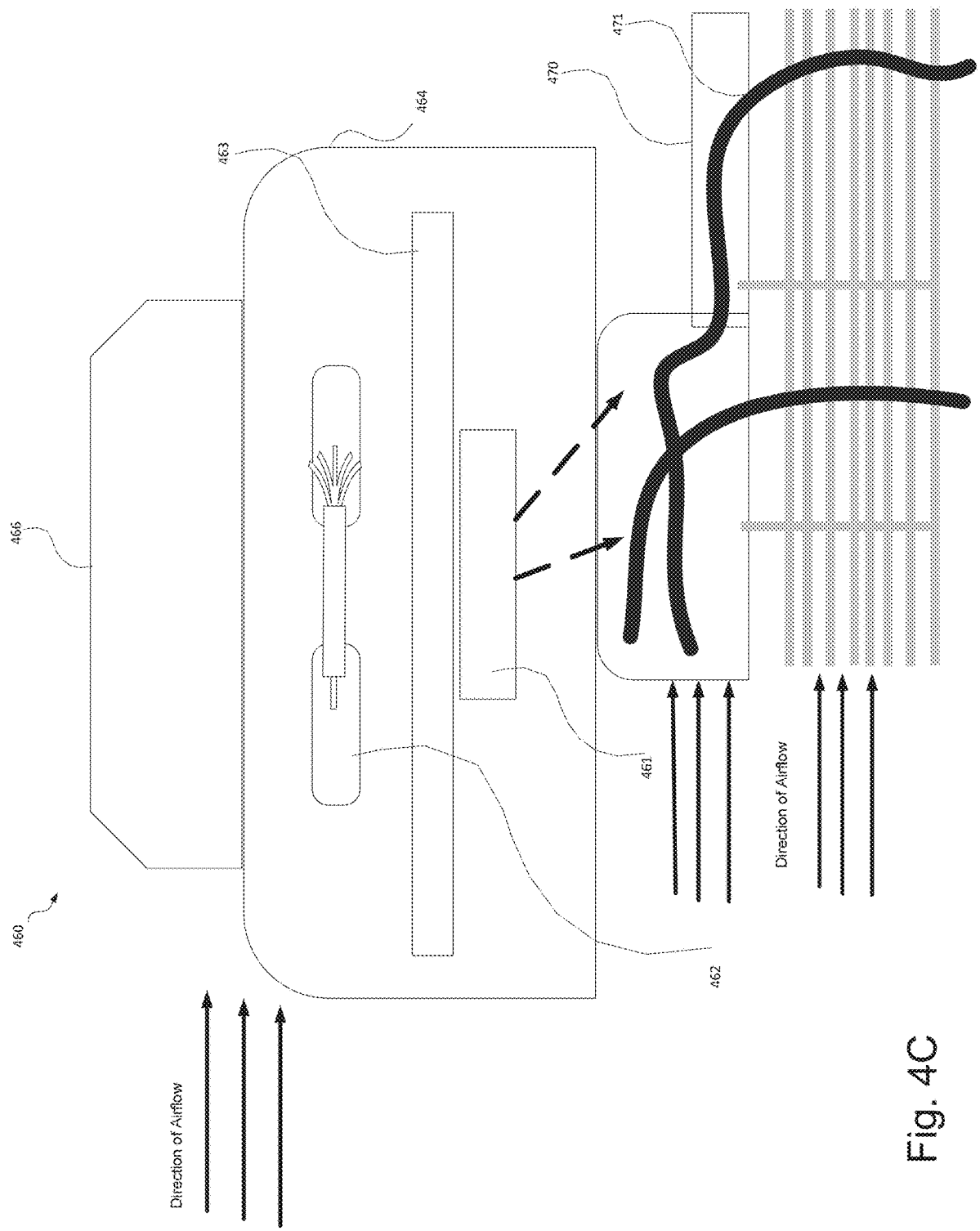

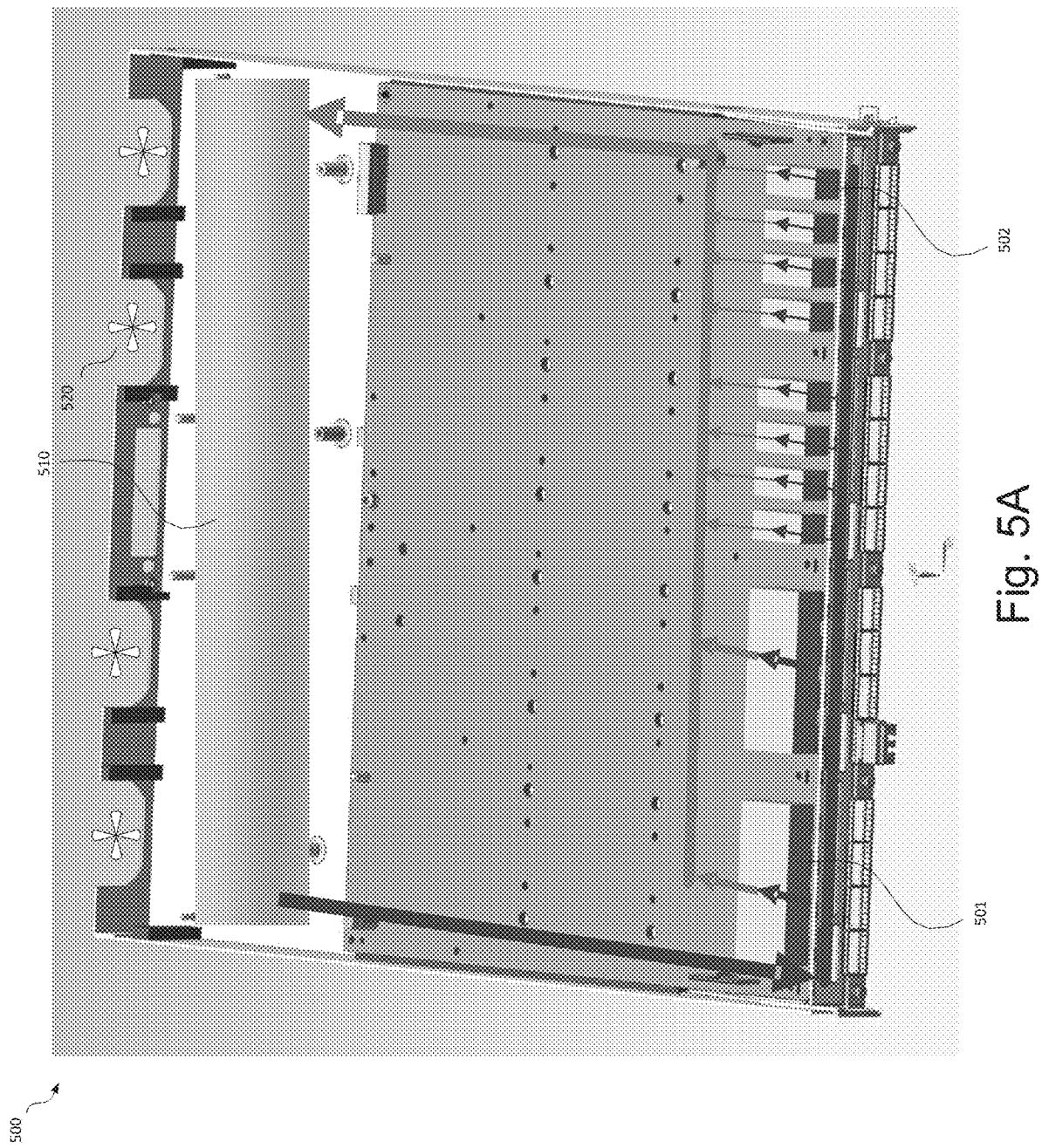

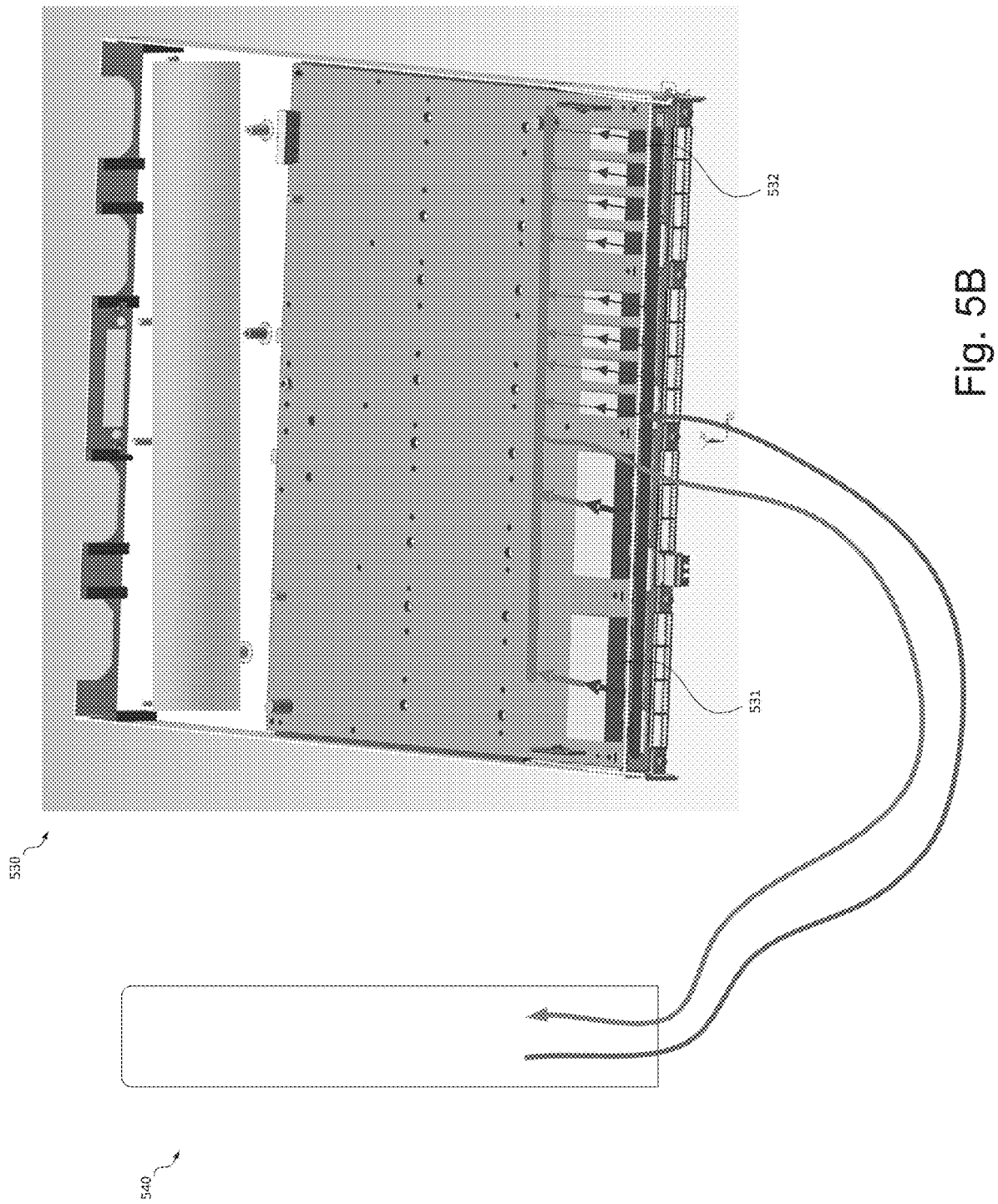

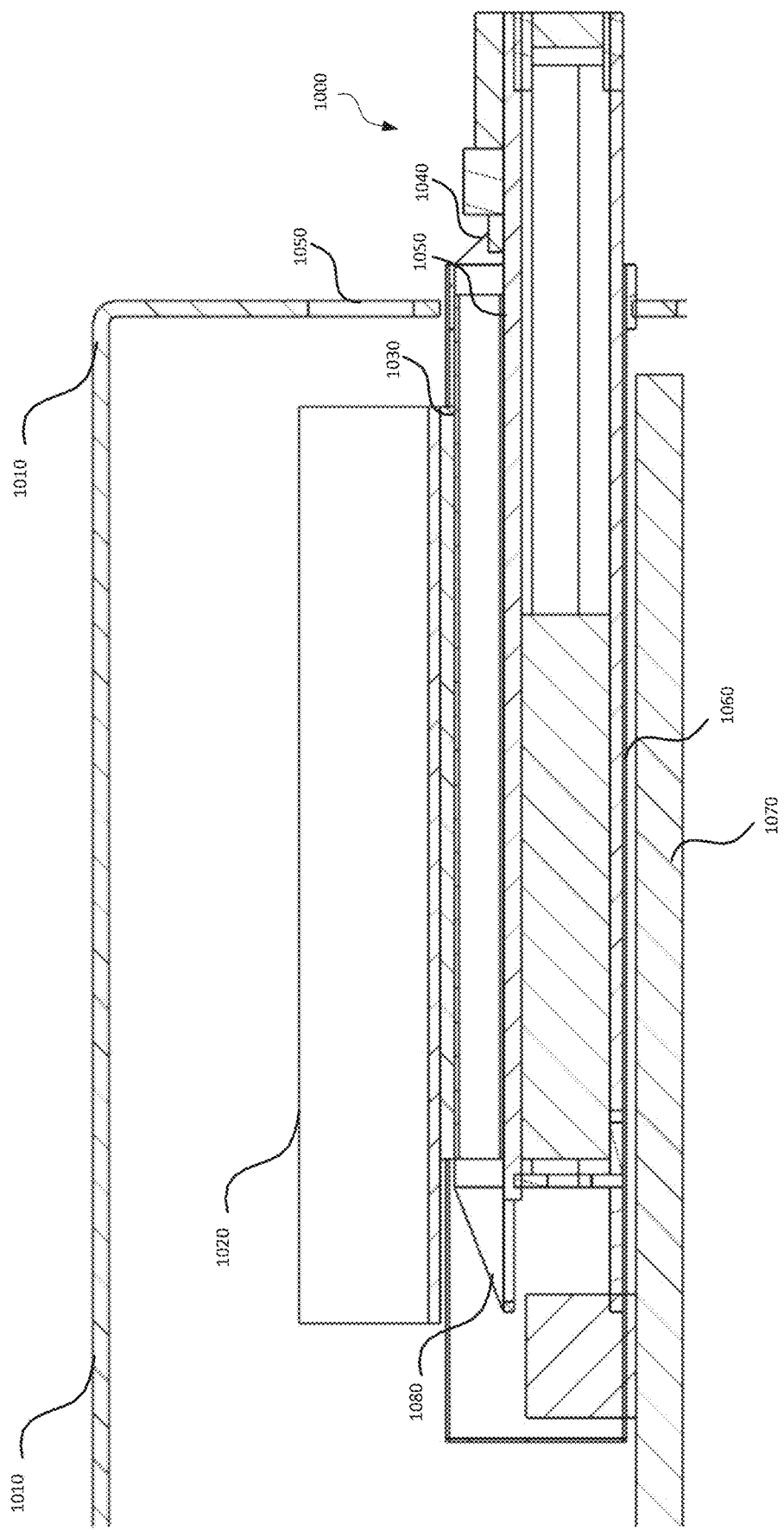

THERMAL OPTIMIZATIONS FOR OSFP OPTICAL TRANSCEIVER MODULES

CROSS-REFERENCE TO RELATED APPLICATIONS

The present application is a continuation of U.S. patent application Ser. No. 17/122,658 filed on Dec. 15, 2020, which claims the benefit of the filing date of U.S. Provisional Patent Application No. 63/047,410 filed on Jul. 2, 2020, the disclosures of which are hereby incorporated herein by reference.

BACKGROUND

Octal Small Formfactor Pluggable (OSFP) is a module and interconnect system with a pluggable form factor with eight high speed electrical lanes. OSFP was designed to initially support 400 Gbps (8 lanes×50 G per lane) optical data links. Compared to other form factors, such as QSFP, OSFP is slightly wider and deeper but still supports 36 ports per 1U front panel, which enables a theoretical 400 G bitrate through an OSFP module. The OSFP has several advantages, including that it is reverse compatible with QSFP formats through simple adapters. The OSFP continues to become more common in supporting optics technologies for data-center and other data transfer applications.

Current OSFP modules consume roughly 10-15 watts to achieve a 400 G bitrate. However, as the throughput requirements on the OSFP module increase, the wattage requirements also increase. This in turn increases the thermal load and electromagnetic interference on the OSFP. With the current standard OSFP form factor, these effects lead to issues in operating the OSFP modules at higher bit rates or throughputs due to thermal and electrical effects.

Further, as the OSFP Module specifications define specific mechanical form factors and electric parameters for compliance with the standard, the above problems cannot be addressed by changing the mechanical form factors of the modules. There is a need for solutions to enable OSFP modules to operate at higher bitrates while maintaining compliance with the OSFP module specification.

SUMMARY

The present disclosure provides methods, systems, and apparatuses for thermal and electrical optimizations for OSFP optical transceiver modules.

One aspect of the present disclosure provides an assembly, the assembly comprising an octal small form factor pluggable (OSFP) module including a data connector, a first heatsink having a top surface and an opposed bottom surface facing toward the OSFP module, a first plurality of hollow channels formed between the OSFP module and the bottom surface, a second heatsink having a surface overlying the top surface of the first heatsink and thermally connected with the top surface, and a plurality of fins extending away from the surface of the second heatsink.

Additional aspects of this disclosure provides an assembly, the assembly comprising an octal small form factor pluggable (OSFP) module including a data connector, a first heatsink having a top surface and an opposed bottom surface facing toward the OSFP module, a first plurality of hollow channels formed between the OSFP module and the bottom surface, a second heatsink having a surface overlying the top surface of the first heatsink and thermally connected with the top surface, and a plurality of fins extending away from the surface of the second heatsink. A first space can exist between at least a first pair of two adjacent fins of the plurality of fins differs from a second pair of adjacent fins, so as to optimize a thermal performance characteristic of the module. The second heatsink can the top surface. A housing can be configured for receiving the OSFP module therein and positioned between the second heatsink and the surface. The housing can include an opening through which the OSFP module and the second heatsink are thermally interconnected. At least part of the module can be comprised of a diamond composite material. In some examples, the diamond composite material can be a silver diamond material. The diamond composite material can be aluminum diamond. At least part of the module can be made of a metal composite material.

Additional aspects of this disclosure provides a system, the system comprising an outer housing having an opening; an assembly disposed within the outer housing, wherein the second plurality of fins are configured to receive airflow from the opening. The assembly can comprise an octal small form factor pluggable (OSFP) module including a data connector, a first heatsink having a top surface and an opposed bottom surface facing toward the OSFP module, a first plurality of hollow channels formed between the OSFP module and the bottom surface, a second heatsink having a surface overlying the top surface of the first heatsink and thermally connected with the top surface, and a second plurality of fins extending away from the surface of the second heatsink.

Additional aspects of this disclosure provides a system, the system comprising an Octal Small Formfactor Pluggable (OSFP) compatible module, an air duct with a first end and a second end, the first end of the air duct forming a closed connection with a back side of the module, a blower, with a first end and an exhaust, the first end of the blower forming a closed connection with the second end of the air duct; and an airpath formed from the front side of the module to the exhaust end of the blower through at least the air duct. The module can comprise a front side and a back side opposite the front side; a substantially continuous top surface extending from a portion of the front side to a portion of the back side and a data connector formed on the front side. The air duct can be formed from a metal composite material. The relative dimensions of the air duct can be based on the air-pressure or air-speed at the back side of the module. The geometry of the air duct can be arranged to prevent the formation of vortices within the system. The frequency of the blower can be based on the geometry of the module. The frequency of the blower can be based on the air-pressure or air-speed at the back side of the module. The airpath can be optimized for heat dissipation from the module.

Additional aspects of this disclosure provides an assembly, the assembly comprising an Octal Small Formfactor Pluggable (OSFP) compatible module, comprising a front side and a back side opposite the front side; a substantially continuous top surface extending from a portion of the front side to a portion of the back side; a data connector disposed formed on the front side, a plurality of pin-fins formed in an array across the top surface, each pin-fins substantially non-linear in shape and enclosing an area formed by a closed loop on the top surface, wherein the plurality of pin-fins minimize a pressure gradient between the front side and the back side of the module. Each pin-fin can be formed in a diamond shape. The front side can contain substantially open air channels above the data connector. The plurality of pin-fins can form rows offset from one another. The plurality of pin-fins can cover at least 30% of the surface area of the top surface. Each pin-fin can form an air-foil, the air-foil providing a path for fluid to move across the top surface. The air-foil can be configured to align with a spring-loaded chamfer formed in a housing for the module. The plurality of pin-fins can be configured to attenuate electro-magnetic interference. The plurality of pin-fins can be configured to attenuate radiation emitted from the front side of the module.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIGS. 4A-4C are side views of example OSFP modules with optimized heat flow through configuration of heatsinks and position of an ASIC relative to a laser according to aspects of the disclosure.

FIGS. 5A-5D are views of example OSFP modules with heat dissipation improvements through water cooling techniques using closed loop water cooling according to aspects of the disclosure.

FIG. 10A illustrates a side view of an example OSFP module 1000 with one or more of the aspects discussed with reference to FIGS. 1A-8E.

DETAILED DESCRIPTION

This disclosure generally relates to methods, systems, and apparatuses for thermal and electrical optimizations in Octal Small Form factor Pluggable (OSFP) optical transceiver modules.

Figure 1A:
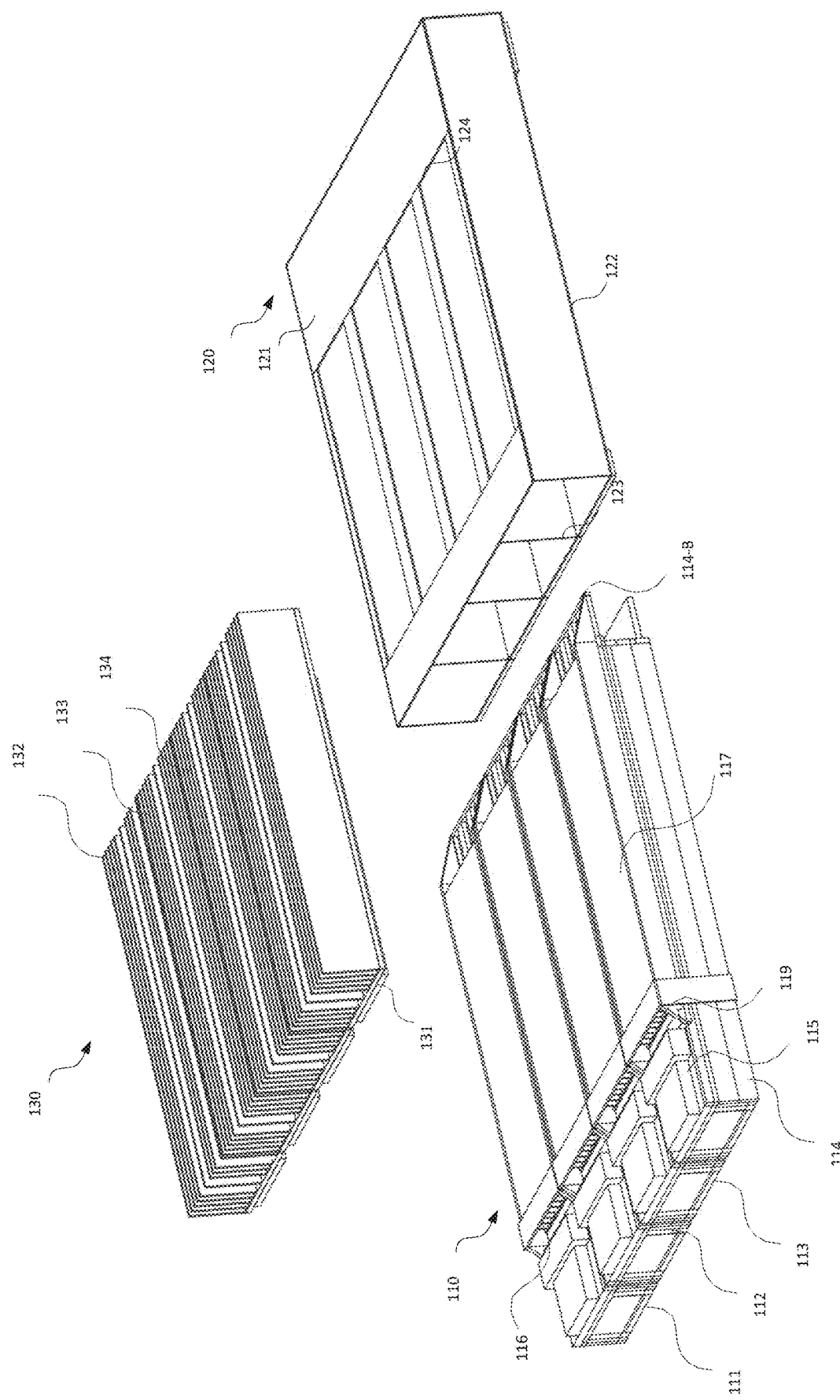
FIG. 1A is an exploded perspective diagram of an example OSFP module according to aspects of the disclosure.

FIG. 1A illustrates an exploded view of OSFP modules and improvements according to aspects of this disclosure. 110 illustrates a block or group of OSFP modules, such as modules 111-114. The block of OSFP modules are configured such that they are compatible with a cage, such as cage 120. Cage 120 is a 1×4 cage meaning that it can house 4 OSFP modules arranged in one row. Cage 120 has four openings and each opening can be configured to house a single OSFP module. Other configurations of cages are possible. In some examples, a 1×1 cage can house a single OSFP module, while in other examples, other arbitrary M×N modules are possible. An OSFP module can contain other components such as opticals, optical receivers, optical transceivers, lasers, and processors to enable the transmission of data. Modules 111-114 and cage 120 can be part of or installed within a larger enclosure. For example, the larger enclosure can have electronics, fans, cooling, or other systems to enable operation of OSFP modules. Cage 120 can have a top surface 121, a bottom surface 122, vertical walls separating OSFP modules, such as separator 123, and a back side or back portion of the separator, rear edge 124.

Module 114 is for example an OSFP compliant transceiver module which meets the parameters of the OSFP form factor and/or OSFP specifications. Module 114 is also an OSFP transceiver module with a connector on one side, connector 115, and a heatsink 117 on the top of the module. In some examples, heatsink 117 can be the top surface of module 114. An inlet can be formed above or near connector 115. Module 114 is intended to be mounted within a rack or cage, as further discussed below with reference to FIGS. 1A-1D. Connectors 115 can make one end or be formed towards one end of module 114. Module 114 can have a throughput across the number of lanes. For example, the throughput of module 114 may be 400 Gbps or 50 G per lane across the 8 lanes. In other examples, a higher throughput of module 114 may exist and corresponding be higher across the lanes.

Module 114 may also be in communication with a computing device. The computing device can be any type of computing device such as a server, cluster of servers, virtual machine, laptop, desktop, mobile device, or custom-designed hardware device. The computing device may contain a processor, volatile memory, non-volatile memory, a user interface, a display, communication interface(s), and instructions.

Although not illustrated in FIG. 1A, modules 111-114 may contain processors or application specific integrated circuits (ASIC). The processor or ASIC of modules 111 may be configured to enable signals to be transmitted through the module. Module 111 may be configured in various modes to enable both high-speed signals, such as those described in the electric specifications of IEEE802.3bs, IEEE802.3cd, or low-speed signals, such as those using the I2C or I3C protocols, which can used for configuration and control of module 111 by a host. The encoding or specific implementation of the signals may depend on the capability of the ASIC or processor within module 111. Similarly, although not illustrated in FIG. 1A, module 111 may contain a laser.

Connector 115 can support various types of communication interfaces. In some examples, connector 115 can be a duplex LC connector, which is a type of fiber connector developed by Lucent Technologies. In some examples, connector 115 can be a multi-fiber push on (MPO) type of optical connector. In other examples, connector 115 can be any known or compatible communication interface capable of enabling transfer of data.

Heatsink 130 is also illustrated in FIG. 1A. Heatsink 130 can be made of a base section, such as base 131, and various fins, such as fins 132-134. The absolute dimensions of the fins and the position of the fins relative to one another is constrained by the size of cage 120, as well as OSFP guidelines and restrictions. In addition, the shape, relative location or position, or absolute position of the fins are optimized to enable better airflow which in turn, can enable the OSFP to remain operable despite the higher amount of heat generated due to the higher wattage requirements associated with an increased throughput. Heatsink 130 can be mechanically attached to cage 120 or make contact with modules 111-114 through the use of springs, screws, clips, or other mechanism to allow the heatsink to easily attach to cage 120 and form a secure connection. Although heatsink 130 is shown as one unit, heatsink 130 can be formed or made in multiple configurations or parts.

Each module can have a plurality of openings or inlets which allow air to enter into the internal volume of the module. For example, FIG. 1A illustrates an inlet 119 of module 114 and inlet 116 of module 111, as well as a surface 117 overlying the inlet 119. Air entering the inlet can cool the module and exit from the back of the module, outlet 114-B. Surface 117 can also cool heat generated within the modules. Surface 117 can couple with base 131 of the heatsink in order to create a thermal connection and allow heat to further dissipate. In some examples, surface 117 can form part of a heatsink or a vapor chamber. Two air-paths are thus formed for cooling the modules.

Figure 1B:
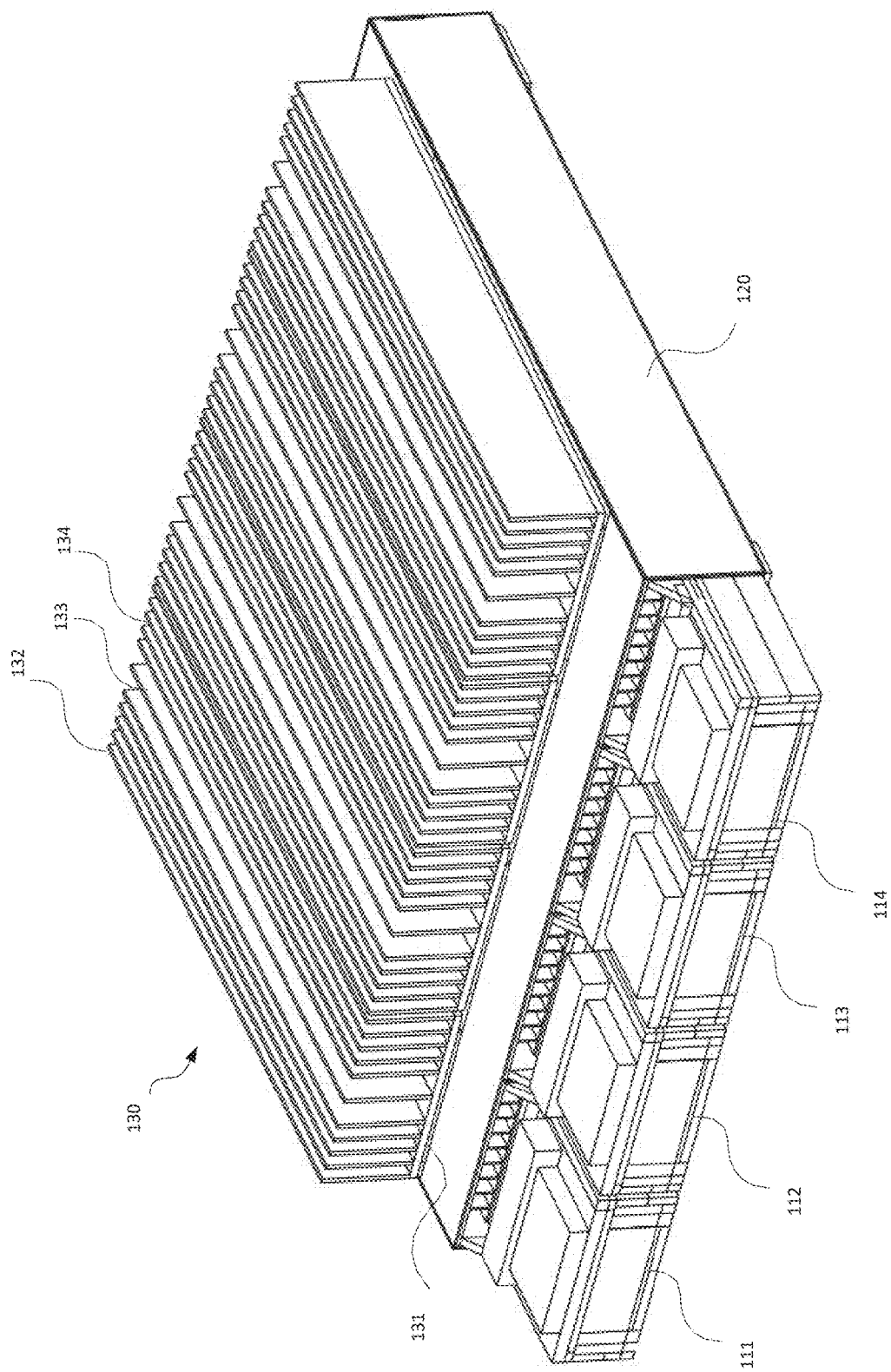
FIGS. 1B-1C are different perspective views of the assembled OSFP module of FIG. 1A.

FIG. 1B illustrates a view of assembled OSFP modules and improvements according to aspects of this disclosure. As illustrated in FIG. 1B, base 131 may be directly adjacent and contact heatsink 130 to allow heat generated within the module to dissipate and be conducted away from the module. Fins 132-134 can divert heat away from the OSFP modules 111-114 and allow cooling.

The fins can extend longitudinally across the length of cage 120 parallel to the top surface 121, perpendicular to the top surface 121, or longitudinally across or parallel bottom surface 122 of cage 120 between an edge of the cage adjacent separators 123 and an opposite and rear edge 124 of the cage. In the example shown in FIG. 1A, fins 132-134 extend along a majority of a length of the cage. Any number of fins may be provided across a width of cage 120. In the example shown, 36 fins extend across the width of the cage, but the number of fins can vary widely.

In some examples, fins may have a length ranging up to the length of cage 120, such as 71.0 mm, a height of 9.9 mm, and a thickness of 0.5 mm. In other examples, the height may range between 9.9 mm and 24.0 mm, the length may range between 6.5 mm and 71.0 mm, and the thickness may range between 0.4 mm and 0.7 mm. Fin pitch may range between 1.3 mm and 4.0 mm. But in other examples, fins may have length less than 6.5 mm or greater than 71.0 mm.

The relationship between air velocity and air pressure drop is roughly quadratic. The power required to move air is roughly a cubic function of the air velocity. The relationship between the fins, the length of the fins, thickness, and contact points with heatsink 131 are optimized to maximize cooling while ensuring that a pressure drop from the front of the OSFP compliant modules is not excessive.

Figure 1C:
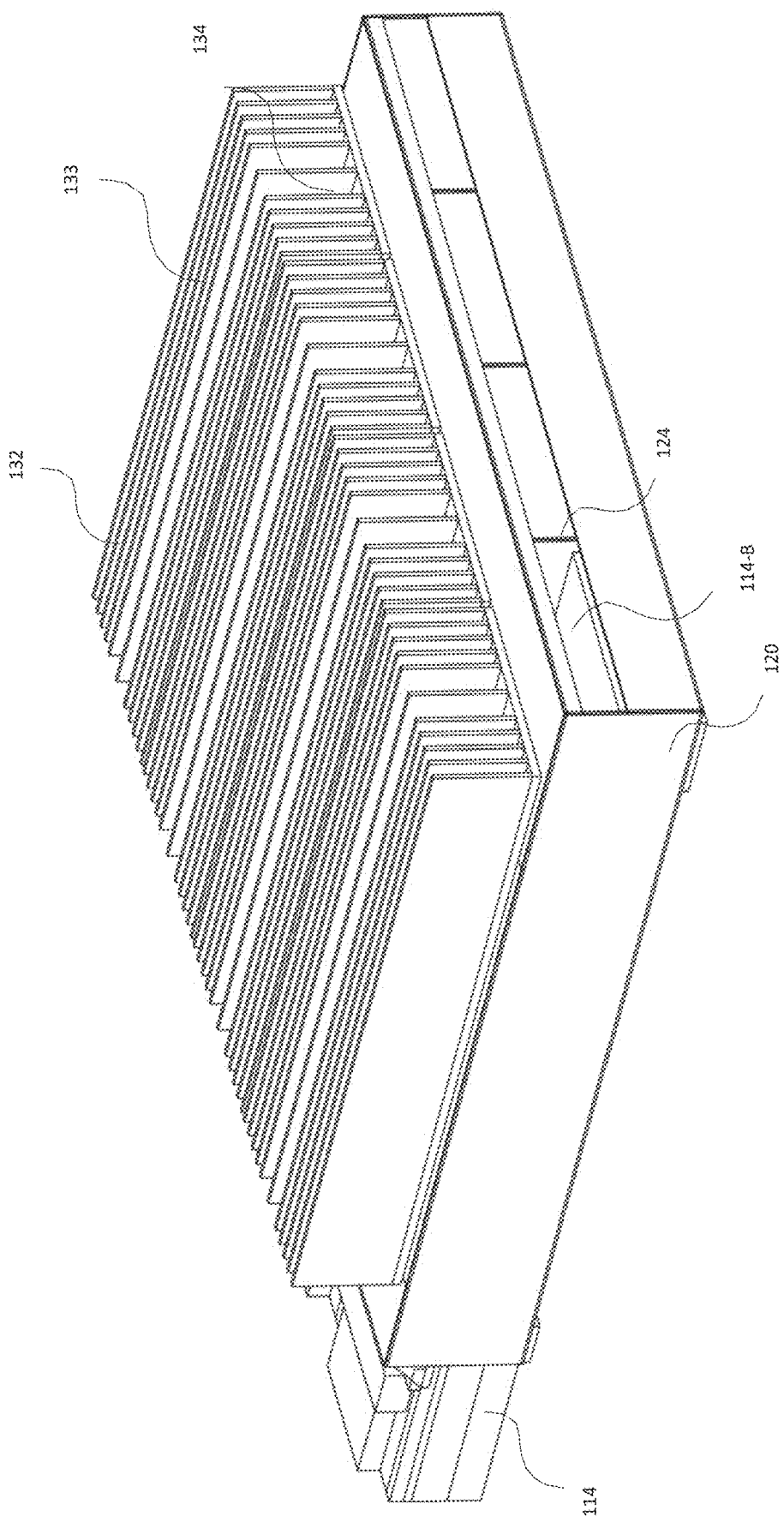

FIG. 1C illustrates an additional view of assembled OSFP modules and improvements according to aspects of this disclosure. Visible in FIG. 1C are outlets for the various modules, such as outlet 114-B. Outlets allow airflow to move from one end of the modules to the other. The airflow through the modules can additionally assist in cooling the modules in conjunction with the heatsinks and fins.

In some examples, one or more components illustrated with reference to FIGS. 1A-1C, can be partially or fully made from diamond composites, such as silver-diamond, aluminum-diamond, or copper-diamond. In some examples, the diamond-composite material can consist of a surface layer which is pure metal surrounding an internal layer or internal core made of diamond or diamond-metal hybrid. The surface layer which has a higher conductivity will allow heat to be transferred more quickly while the internal core, which is made from diamond or diamond-composite, will not conduct heat in the same manner. Through selective use or engineering of materials, heat can be directed away from areas of the module which are more likely to overheat, such as the laser or the ASIC. For example, the coefficient of thermal expansion for silver diamond is 6.5 ppm/K while the thermal conductivity is 900 W/(m·K). The low coefficient of thermal expansion while retaining a high thermal conductivity allows for the module to be more effectively cooled while retaining tight tolerances to maximize the dimensions of the fins and other cooling components. In some examples, the components can be made from any metal matrix composite material. A metal matrix composite material is a material with at least one of the materials being metal to allow for higher thermal conductivity while retaining properties of the other material.

Figure 1D:
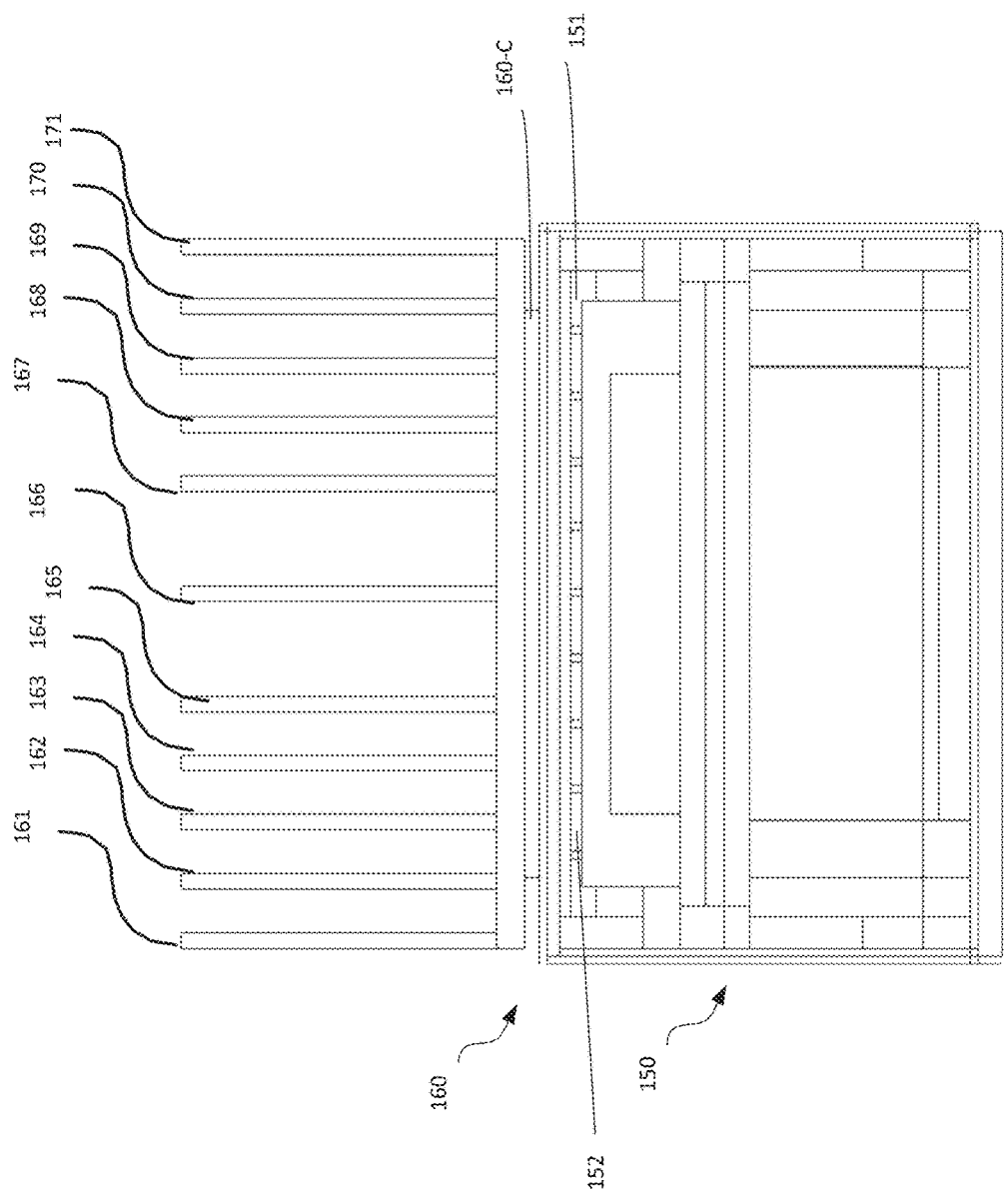
FIG. 1D illustrates a view of a front view of an example OSFP module with a heatsink having fins.

FIG. 1D illustrates a view of a side view of a module 150 with a heatsink 160 and fins 160-171. The spacing of the fins illustrates a varying gap between fins 160-171 designed to optimize airflow and cooling over components or areas of module 150. For example, the gap between fin 165 and fin 166, and fin 166 and 167 is larger, allowing for a greater volume of air to flow closer to the center of module 150. Inlets 151-152 of module 150 allow air to enter into the interior volume of module 150. Heatsink 160 can make thermal contact with module 150 through base 160-C. As can be seen from the side view, two paths for air exist, allowing for additional cooling while keeping compliance with the OSFP specification.

While FIGS. 1A-1D provide several example arrangements of cooling fins, it should be understood that further arrangements are possible. For example, the number, spacing, shape, or combination of fins may be modified. Additionally, although not illustrated in FIGS. 1A-D, an external housing can house cage 120. An opening with an external housing can be optimized in terms of spacing, size, dimension, or geometry to optimize for a physical parameter of the system such as for example, heat dissipation, pressure drop, or average temperature drop. As there is usually a fixed volume, rate of airflow, or mass-flow rate across the opening of an external housing and through the external housing, the airflow can be divided across the inside of module 150 and across heatsink 160. As the total mass-flow rate is typically fixed, the division between the external housing and the internal housing can be determined by the opening of the external housing.

FIGS. 2A-2D illustrate top-down views of a portion of a module. Illustrated in FIG. 2A-2D are module components 210-240. Due to the length of a module, such as module 111, there will be a pressure drop from one end to the other of the module and airflow may also be restricted within the module. Components 210-240 are designed to reduce excessive pressure drop along the length of each component and allow for the airflow to be less restricted. The module components can have a top surface, such as surface 211, 221, 231, and 241.

Figure 2A:
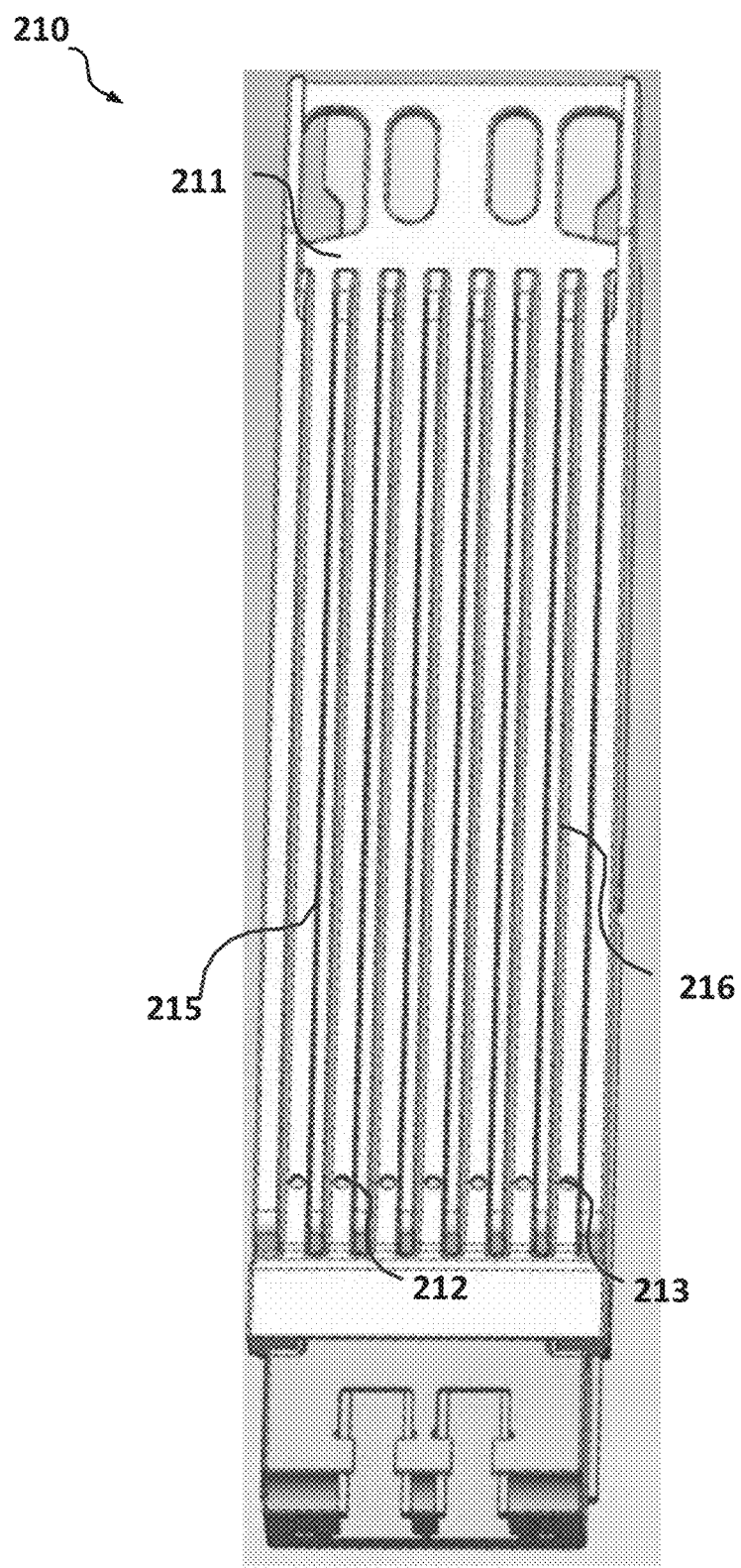
FIG. 2A is a top-down view of an OSFP module with example cooling holes and channels according to aspects of the disclosure.

Illustrated in FIG. 2A is component 210 with surface 211. Holes can be formed on surface 211, such as holes 212 and 213. Holes 212 and 213 are circular in shape. Formed on surface 211 are a plurality of ridges, including ridge 215 and ridge 216, which can minimize the volume occupied by air as it moves over surface 211 of component 210. Additionally, the ridges help channel air in one direction or create "tunnels" of air. Ridge 215 and ridge 216 can extend longitudinally along the length of the module and the space between two adjacent ridges can form "channels" which also extend along the length of the modules. The ridges can be thermally conductive and act as a heatsink or form part of a heat transfer path away from module 210. This can assist in minimizing the pressure difference between the two ends of the surface. Although not illustrated, additional holes can be formed along the length of surface 211 to further allow additional inlet air into the interior volume of component 210. The holes can be of any shape or be shaped based on the exact form or dimensions of component 210 to maximize the airflow inside the component. In some examples, the holes can be 2-5 mm in length and spaced at 5-10 mm. In other examples, holes smaller than 2 mm and larger than 5 mm and at any spacing can be formed. In other examples, the holes can be made in a zig-zag pattern. The holes can be made in a variety of patterns on surface 211.

Figure 2B:
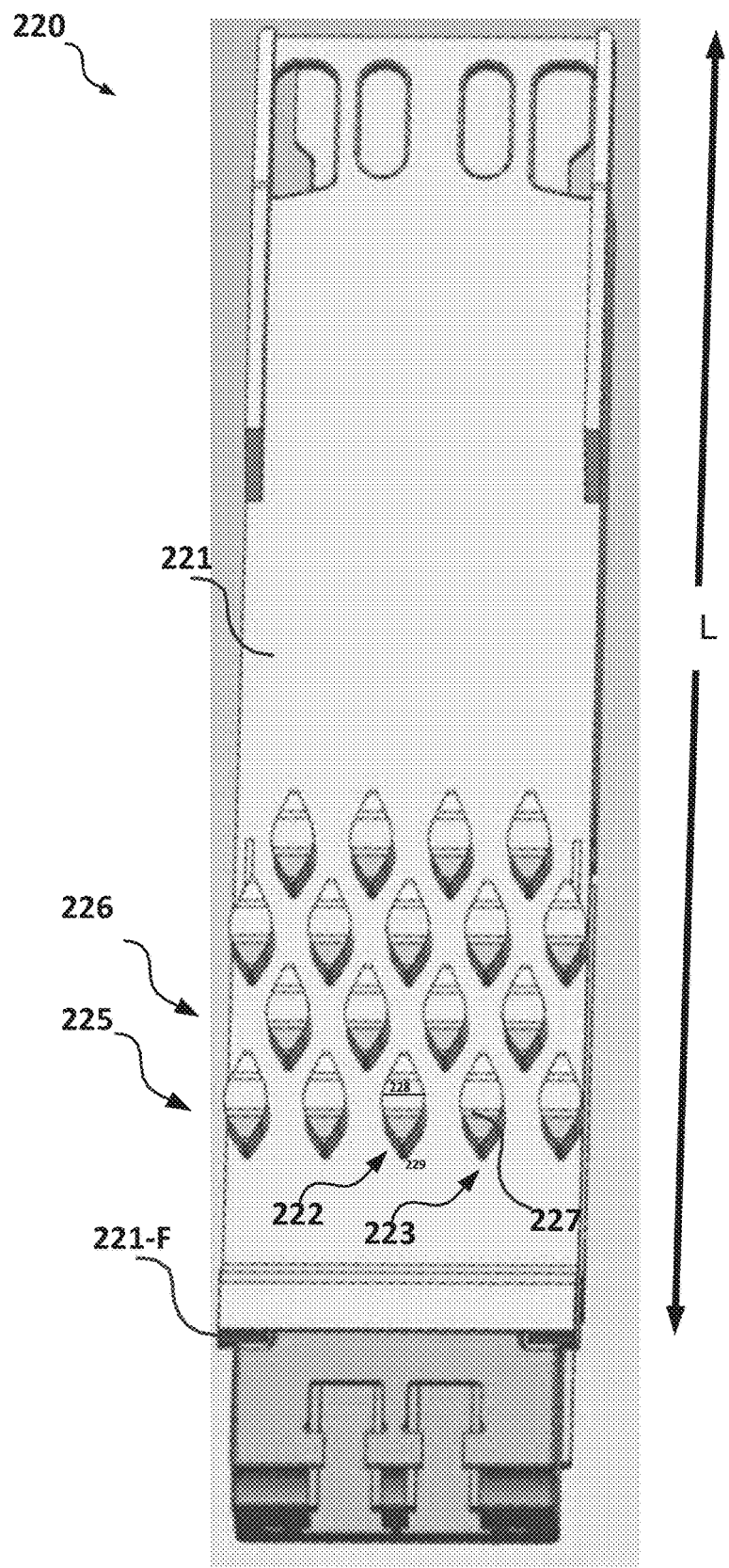
FIGS. 2B-2D are top-down view illustrations of example cooling pin-fin arrangements in an OSFP according to aspects of the disclosure.

Illustrated in FIG. 2B is component 220. Present on surface 221 are a plurality of pin-fins extending perpendicular to the length of surface 221, such as pin-fin 222. These pin-fins minimize the air pressure drop from the one end of component 310 to the other end of component 310. In addition, pin-fins 222 can be shaped to further have an inlet or air foils, which allow air to enter into the interior volume of the component. The height of any one pin-fin is fixed by the OSFP form factor, but the width and the length of the pin-fin can be optimized for the smallest drop of pressure in air flow.

Pin fins may take on a variety of geometric shapes. In one example, as shown in FIG. 2B, pin-fins have an elongated and diamond shaped body with rounded edges. A width 228 at a central portion of pin-fin 222 can be greater than a width 229 at the outermost and opposed ends of pin-fin 222. In other examples, the pin-fins have a different shape, such as rounded, square, tear-drop, sinusoidal, or any variety or combinations of shapes. The top surface 227 of pin-fin 223 may be planar, but in other examples, the top surface of pin-fin 222 may be non-planar and have a curved surface. In some examples the top-surface of the pin-fin can be planar while in other examples the top surface of the pin-fin can be contoured.

The pin-fins may be positioned on any portion of surface 221. In the example of FIG. 2B, pin-fins 222 are positioned within a front half of surface 221 adjacent front edge 221-F of component 220. Pin-fins may instead be positioned within a rear half of surface 221 adjacent rear edge of component 220. In still other examples, pin-fins 222 may extend along an entire length L or a majority of length L of surface 221. A few of these additional examples will be further discussed below.

Pin-fins may be arranged in any number of patterns. As shown, rows of pins are staggered along length L, such that a second row 226 of fin pins is positioned between each of the fin pins in a first row 225. This pattern can continue along the length L of surface 221. In other examples, pin-fins may be arranged in straight lines or columns. Similarly, pin-fins may be arranged at any random points along surface 221.

Figure 2C:
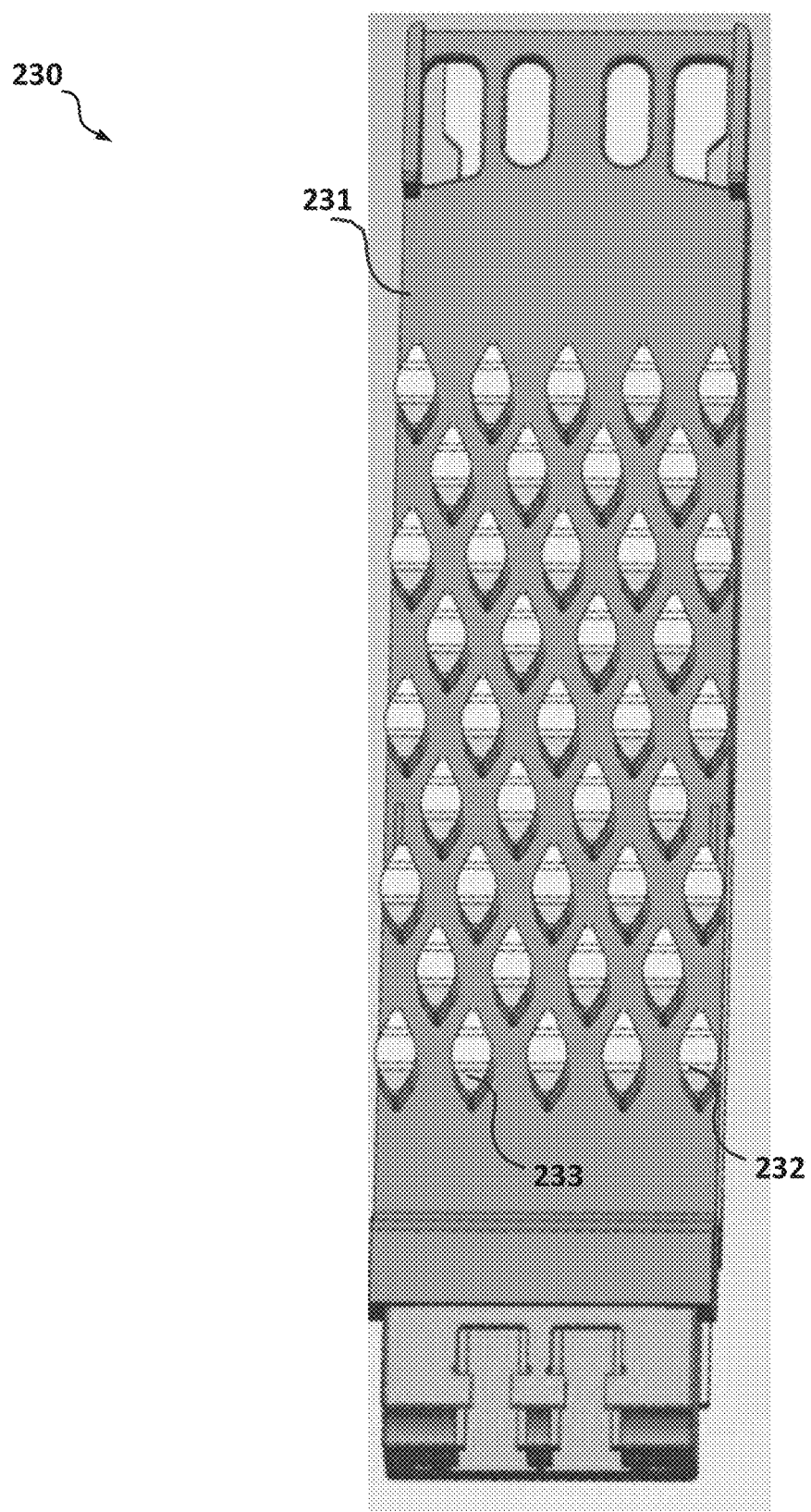

Illustrated in FIG. 2C is component 230. Similar to component 220, present on surface 231 of component 230 are pin-fins 232 and 233. This example illustrates pin fins extending along a majority of a length L of surface 231, and covering substantially the entire surface 231. In some examples, the pin-fins can extend away from the surface, such as 2 mm away from the surface. In other examples, the pin-fins can extend less than 2 mm or greater than 2 mm away from the surface.

The pin-fins may be formed in any geometric shape. In some examples, the pin-fins can formed of a fixed or varying height. The pins-fins may take on a variety of shapes and the geometries of the pins may vary from pin-to-pin or row to row. In yet other examples, a variety of geometries can be used for the pin-fins to create various pathways for airflow over surface 241. In some examples, the geometry of the pin fin may be chosen based on the known throughputs or thermal characteristics of an OFSP module. In other examples the geometry of the pin fin and arrangement of the pin-fins can be chosen based on the thermal characteristic of a module, such as an ASIC or laser contained within it. In some examples, the plurality of pin-fins and foils can be arranged to form a partial array on the surface of a component, as well as arranged to correspond to the location of a heat source within the component to enable the lowest pressure drop. For example, the pin fins may only cover a central one-fourth portion of a surface in a relatively dense pattern while other portions of the surface may not contain pin-fins or may contain pin-fins of relatively lower density. In other examples, more complex geometries, such as a Fibonacci spiral, can be arranged to optimize heat exchange, cooling, airflow, pressure, or other parameters. In some examples, the pin-fins can form an array near an ASIC or laser within the module to allow for additional cooling in that region and improve overall heat dissipation characteristics. The pin-fins can further provide additional thermal connectivity with the cage in which the OSFP module is placed.

Figure 2D:
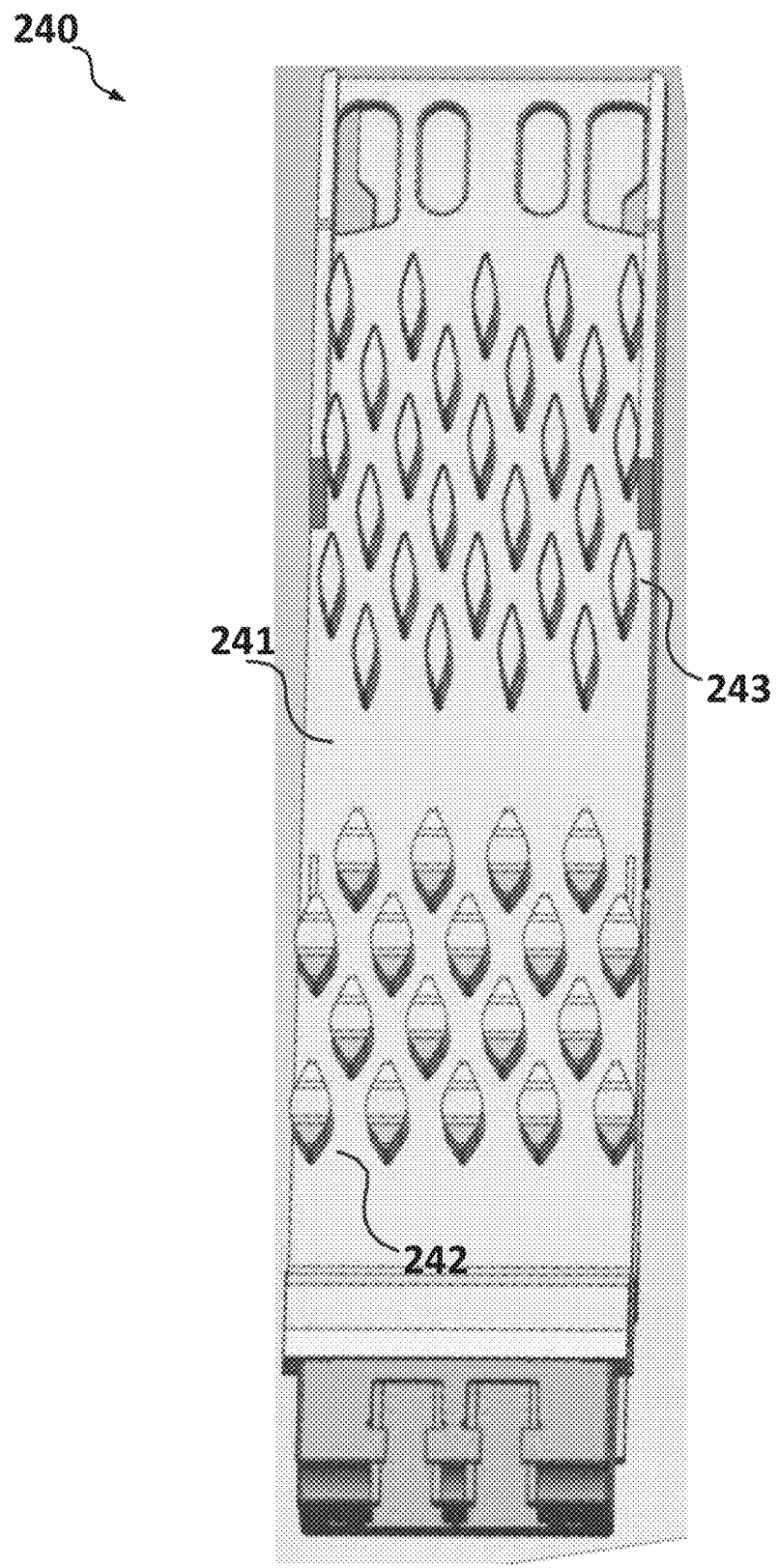

Illustrated in FIG. 2D is component 240. Similar to component 220, present on surface 241 of component 240 are pin-fins 242 and 243. Pin-fins 242 and 243 have different dimensions.

While FIGS. 2A-2D provide several example arrangements pin-fins, it should be understood that further arrangements are possible. For example, the number, spacing, shape, or combination of pin-fins may be modified. In some examples, an external heat sink, such as that referenced in FIGS. 1A-1D can be modified to mechanically mate or otherwise make contact with an arrangement of pin-fins to allow for additional thermal dissipation.

Figure 3A:
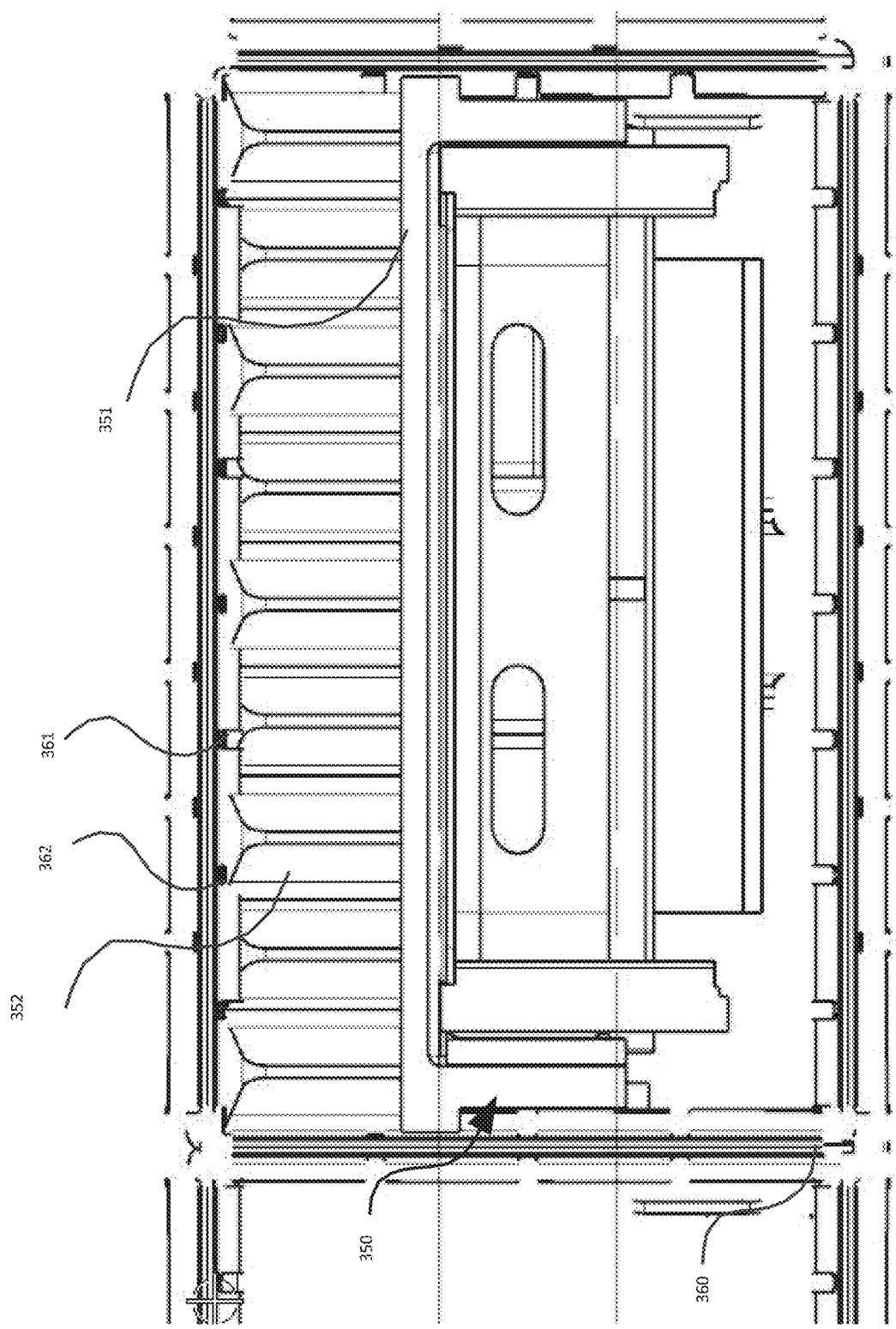
FIG. 3A illustrates a cross-sectional view of an example OSFP module, a housing, pin-fins, and air-foils according to aspects of the disclosure.

FIG. 3A illustrates a cross sectional view of a housing 350 of an OFSP module fitted within a cage 360. Airflow is directed "into" the page or in the direction of arrows 365-368 shown in FIG. 3B. Housing 350 can have a surface 351, and upon it a plurality of pin-fins, such as pin-fin 352. Pin-fin 352 can further contain or form an air foil. An air-foil can be created from the volume enclosed by a surface of a pin-fin. The pin-fin can be shaped such that an interior portion of the pin-fin is hollow and forms an interior cavity. The interior cavity can provide a space for air to enter into and fill the volume of the interior cavity. The interior cavity can take on a variety of shapes and in one example may possess a funnel-like shape, which is visible when viewed from the top. In other examples, the outer surface of the pin-fin can include breaks or openings in the surface to allow air to flow into the inner volume of the air-foil. For example, a portion of surface 241 enclosed by pin-fin 242 can be removed, creating a pathway for air to move across the surface. This can further enhance cooling from the interior of housing 350 and maximize airflow into the air foil.

Cage 360 can be chamfered to contain depressions within the surface of the cage, such as at chamfer 361 and chamfer 362. Chamfers 361 and 362 can be spring loaded such that they are flush with the internal surface of cage 360 unless an external force is applied to them. Upon application of an external force, chamfers 361-362 can be depressed in towards cage 360 in the same direction of the application of force. The pin-fins can align within the depression of the chamfers. For example, chamfer 362 aligns with pin-fin 352. Thus, when inserting the housing 350, or a module, such as module 231, into a cage, mechanical stresses and damage can be minimized by aligning the chamfers and pin foils. In addition, the pin foil can push against chamfer 362, depressing a spring of chamfer 362, and make a tight connection with the chamfer 362. In this manner, any microcurrent or induced current within the system can be effectively grounded through the mechanical and electrical contact between pin-foil 352 and chamfer 362.

Radiated emission or radio frequency energy can be emitted from the housing in the opposite direction of the airflow. Radiation can be generated during operation of the modules, such as by an ASIC or laser within the module. In some examples, pin-fins can be utilized and optimized based on width, length, and to minimize pressure drop through the length of the housing while still attenuating radiated emissions sources. In other examples, the use of pin-fins arranged in rows offset from one another attenuates the radiation as each pin-fin reflects back or attenuates radiation. In some examples, by using multiple rows of pin-fins, the radiation can be attenuated by a larger extent. A person of skill in the art would understand that various combinations and designs are possible for various use cases of module 350.

Figure 3B:
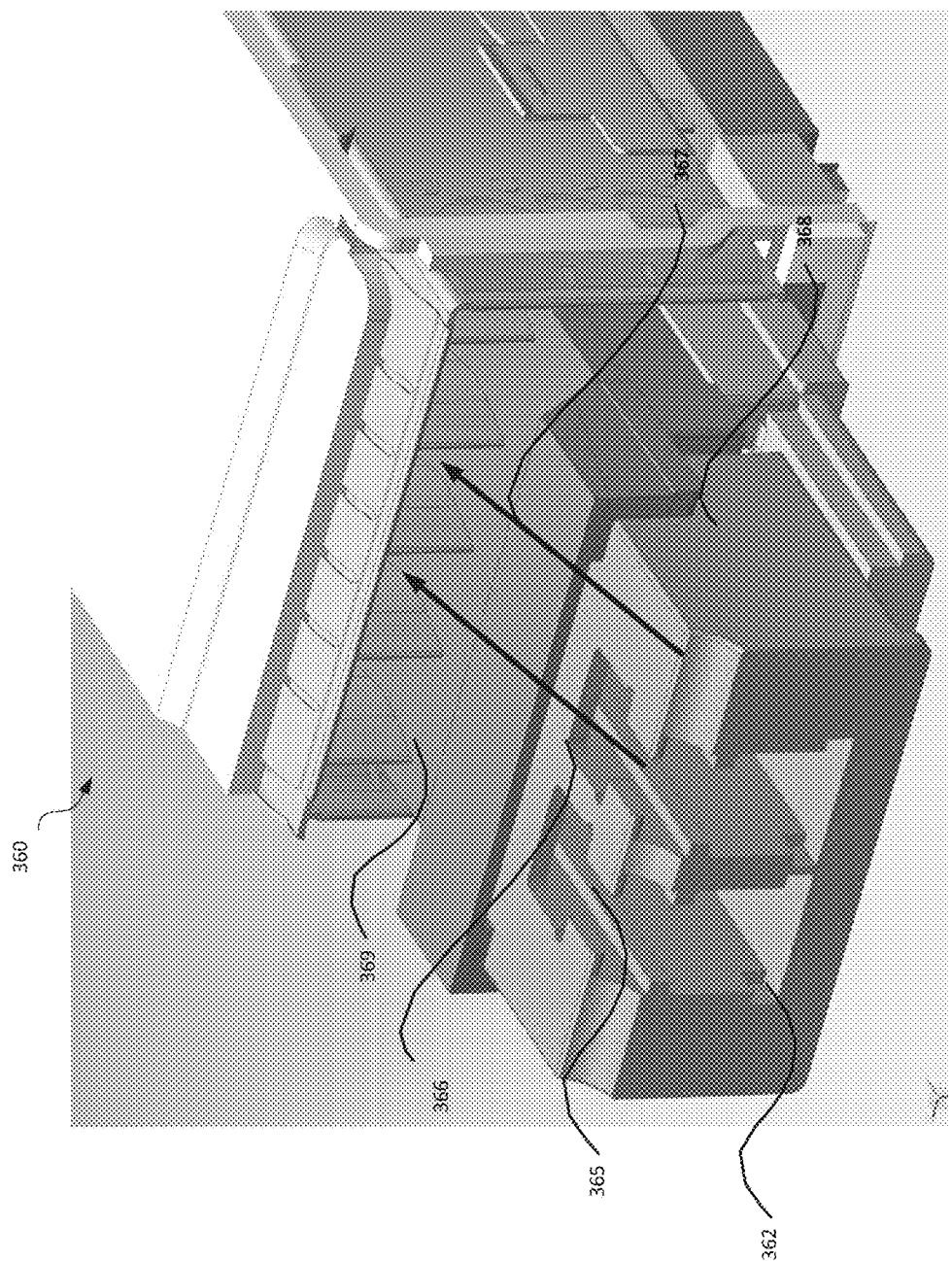
FIG. 3B illustrates a perspective view of an example OSFP module housing with air-foils according to aspects of the disclosure.
Figure 3C:
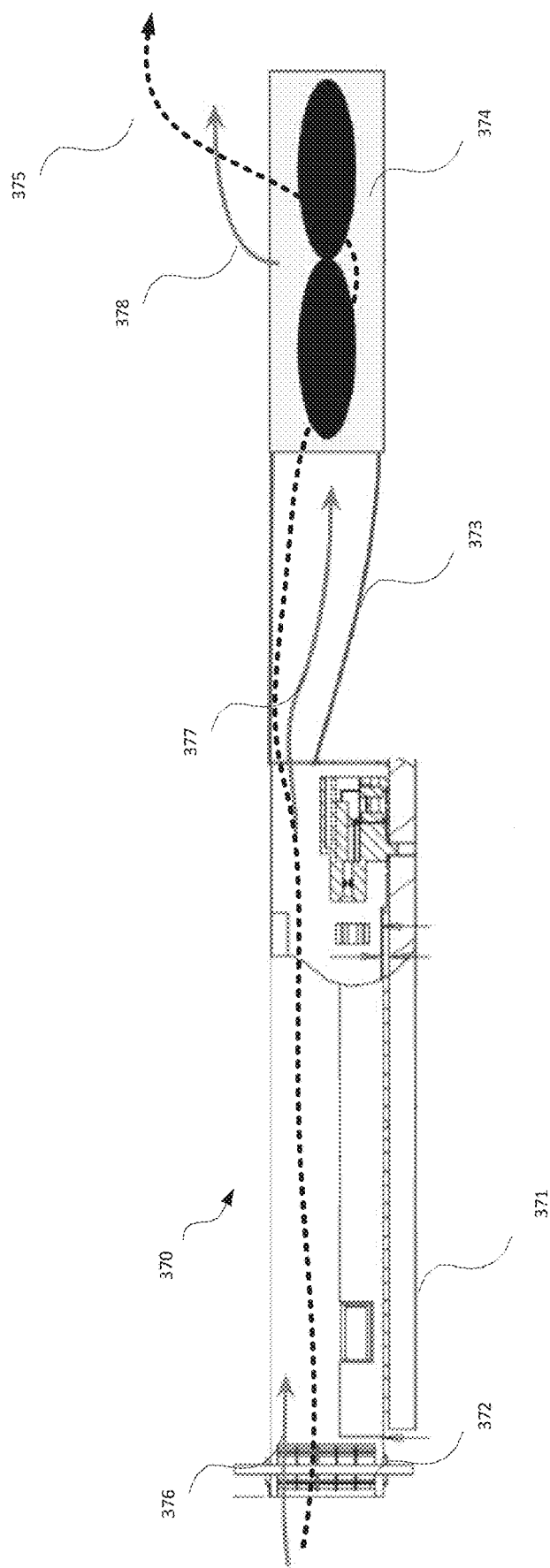
FIG. 3C illustrates a cross-sectional side view of an example OSFP cooling system with optimized airflow according to aspects of the disclosure.

FIG. 3B illustrates a partial view of a module, module 360. Module 360 can be similar to module 111 described above. Illustrated in FIG. 3C is the connecting side of module 360 with a receiver 362. Receiver 362 can be any suitable receiver supported by the OSFP specification discussed above. The module can also contain inlets above the receiver, which are designed to optimize airflow into module 360, such as inlet 369. The specific shape and design of the inlets can be based on the geometry of module 360 as well as the operating conditions of electrical housing contained within module 360. Illustrated in parallel arrows labeled 366 and 377 is the direction of airflow into module 360. Additional arrows are not illustrated for clarity in FIG. 3C, but it is understood that air is flowing into the module 360 at many locations of inlet 369.

In some examples, the inlets, such as inlet 369, can be replaced with a vapor chamber. A vapor chamber is a chamber which is filled with a coolant. The coolant, when heated, changes from a liquid phase to a gas phase. Once gaseous, the coolant circulates via convection and moves freely through the chamber. The gaseous molecules condense on cold surfaces, dissipate their heat load, and are channeled back to the coolant reservoir. This process allows for cooling with a fixed or known amount of coolant. The coolant reservoir can extend along part or the entire length of module 360.

FIG. 3C illustrates a side view of an OSFP module within a cage 370. Illustrated in FIG. 3C is a module 371 with a connector 372, and air duct 373, and a blower 374. Air entering module 371 is indicated with a solid line 376. Airflow between the connector 372 and air duct 373 that is distributed to the blower 374 is indicated with a solid line 377. Air leaving the blower 374 in indicated with a solid line 378. The temperature of the air increases as it moves through the OSFP module from the left side, adjacent a data connector of the module within cage 370, through the right side of the cage 370. The temperature of the air can reduce or stay similar as it moves out through cage 370 and left to right through membrane 373, and through to the right side, adjacent the blower 374. Module 371 can be similar to the modules described above, such as module 111. Air duct 373 can have a first end and a second end, and can enclose a fixed volume. Air duct 373 can be made of any suitable material, such as plastic, polymer, or metal. Air duct 373 be a duct which allows for air to be ducted away from one end of module 371. Blower 374 can be attached to one end of air duct 373 while module 371 is attached to the other end. This attachment can create an airpath 375. As there is an independent pathway for the module, the airflow within a module can be decoupled from the airflow of a tray or housing within which the module is placed, a high pressure pathway can be created for the module and be decoupled from the air-flow requirements of the tray or housing.

Further, the connections between module 371, air duct 373, and blower 374 can be formed of a rigid, flexible, or semi-flexible membrane. Membranes and openings between the parts can be chosen on the basis of the geometry of the module, the air pressure, and the specific fluid dynamics generated by the system. For example, it is possible that vortices or other undesirable phenomena are created by choosing the dimensions of the openings or connections between the module, air duct, and blower. Such vortices can disrupt the smooth airflow desired over module 371. In addition, vibrational load, frequency, resonance frequency, temperature and other parameters must be considered when engineering airpath 375 to ensure that the airpath can optimally cool the OSFP module. In some examples, air duct 373 can be several cm long and form an angle relative to the module. The angle may range, for example, between 5-35 degrees, but in other examples, the angle may be less than 5 degrees or greater than 35 degrees. The relative geometry of the air duct can be based on physical or operational parameters of the module, such as the module length, the air pressure at any part within the module, the airflow through the module, or the temperature of the air exiting the module.

Blower 374 can be any device which can generate an air jet. The blower will create negative pressure, further increasing air flow through module 371. This in turn will allow the module to be more effectively cooled. In some examples, blower 374 can operate at a frequency of 100-1000 rotations per minute and move 5 cubic-feet of air per minute. But, in other examples, the frequency may be less than 100 rotations per minute or more than 1000 rotations per minute to move 5 cubic feet of air per minute. In still other examples, the rotations per minute can be modified to move less than or more than 5 cubic-feet per minute. The blower can be chosen to optimize cooling, airflow, pressure, or temperature drop within the module. The blower can be chosen based on its frequency, vibrational characteristics, ability to create pressure gradients, or other similar parameters.

In some examples, the methods and apparatuses described with reference to FIGS. 3A-3D can be used separately or in conjunction with one another.

Figure 4A:
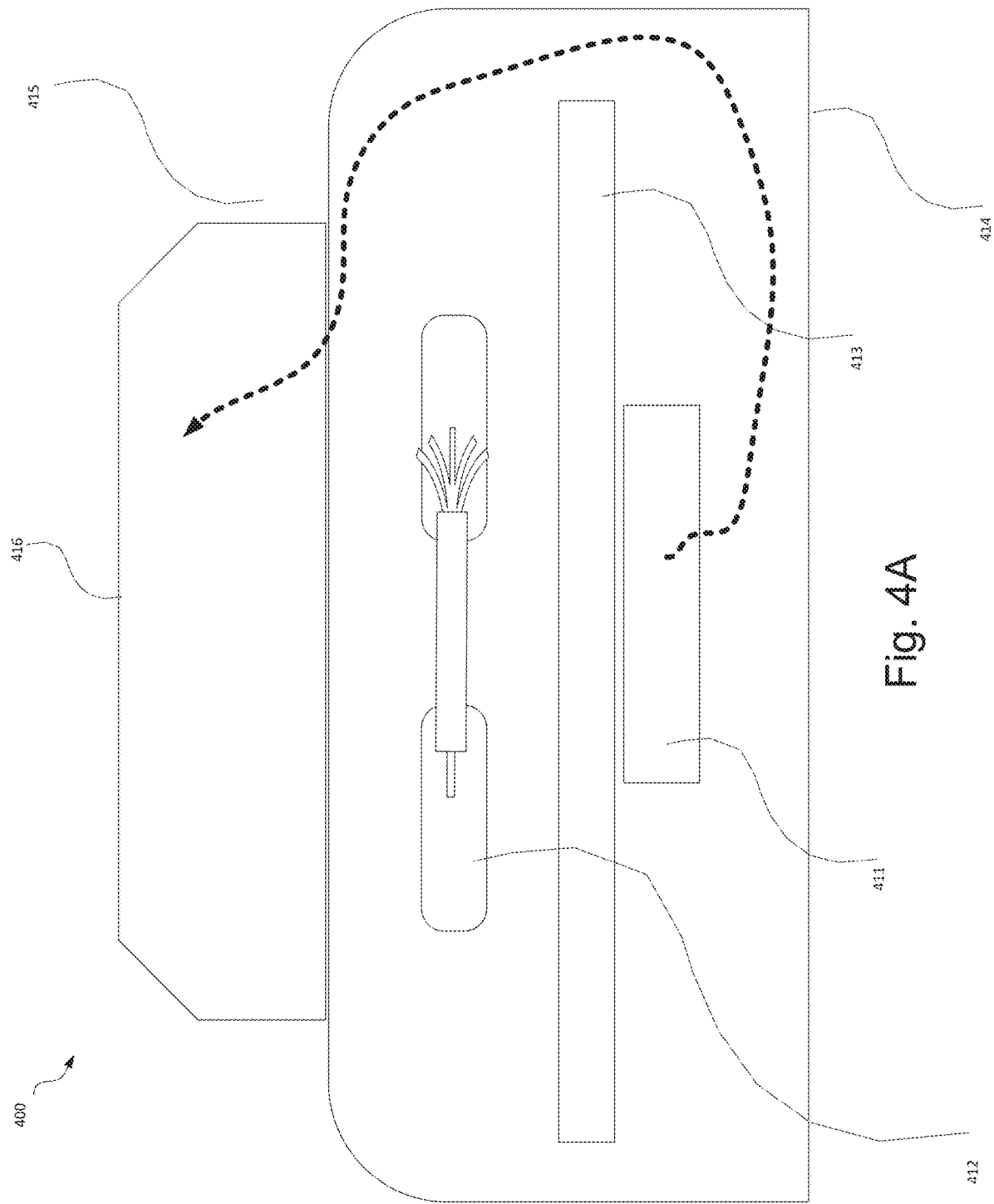

FIG. 4A illustrates a schematic cross-sectional view of an OSFP module, module 400. FIG. 4A illustrates an ASIC 411, a laser 412, a printed circuit board 413, and a housing of the OSFP module, housing 414, a thermal path 415, and a heatsink 416. Also illustrated in FIG. 4A in a dashed solid line is an expected path or one path for heat dissipation. The ASIC is an application specific integrated circuit. ASIC 411 is mounted to the bottom of the module. In some examples, laser 412 can be a laser operating at 10 watts. Laser 412 typically has an upper operational temperature limit of around 70 C. However, ASIC 411 can run at much higher temperatures, and as illustrated in FIG. 4A, sits below the laser. During normal operation of the ASIC, the excess heat generated may disturb the normal operation of the laser, particularly given that the ASIC is further away from heatsink 416. The indirect thermal path not only causes heat to tend to move towards laser 412 but additionally is ineffective in channeling heat away from the ASIC.

FIG. 4B illustrates a cross-sectional view of an OSFP module 450. Also illustrated in dashed solid lines are paths of heat dissipation from module 450. Similar to module 400, module 450 contains an ASIC 451, a laser 452, a printed circuit board 453, a housing of the OSFP module, housing 454, a thermal path 455, and a heatsink 456. By moving ASIC 451 above printed circuit board 453 and moving laser 452 below the printed circuit board, heat is more easily dissipated away from the hotter ASIC. In addition, printed circuit board 453 can act as an insulator and prevent some of the heat generated by ASIC 451 from reaching laser 452.

FIG. 4C illustrates a schematic cross-sectional view of an OSFP module 460. FIG. 4A illustrates an ASIC 461, a laser 462, a printed circuit board 463, and a housing of the OSFP module, housing 464, a thermal path 465, and a heatsink 466. Also illustrates is an additional finned air heatsink, heatsink 470. Heatsink 470 sits below the OSFP module 400 and makes contact with the module along a portion of the length of the module. This enables the OSFP module to fit within cages without heatsink 470 obstructing the insertion of the module 400. Heatsink 470 can also contain heatpipes, such as heatpipe 471. Heatpipe 471 can be made of any conductive material, such as a metal or metal compound. In some examples, the heatpipe can be made of copper, gold-composites, silver, or other metal composite materials. The material of heatpipe 471 can be chosen based on a coefficient of thermal expansion of both the heatsink material and the heatpipe. By adding heatsink 470, it is possible to more efficiently cool ASIC 461 and allow more heat to be dissipated via heatsink 460 as compared to heat sink 461. In some examples, the surface area of heatsink 470 can be increased through the use of fractal geometry. In some examples, the amount of heat dissipated by heatsink 470 can be between 10-100 watts. Although heatsink 470 is oriented in one direction, it is understood that the heatsink can be oriented at various directions relative to module 460. The airflow can also be oriented in various directions relative to module 460 and heatsink 470.

In some examples, heatpipes can be replaced with vapor chambers containing coolant to provide additional cooling. A coolant can be chosen to be a material with a high thermal conductivity, a material with phase changes, or a material with a high specific heat.

FIG. 5A illustrates a top-down view of a rack which can house several OSFP modules, rack 500. Rack 500 has a front side and a back side. Rack 500 is designed to house and cool OSFP modules when inserted into the front side. Rack 500 can house cages, such as cage 120. Rack 500 has a plurality of heat exchangers which correspond to OSFP modules. For example, heat exchanger 501 corresponds to four OSFP modules. Heat exchanger 502 corresponds to a single OSFP module. The heat exchangers can contain a suitable liquid coolant which can absorb heat generated from an OSFP. The liquid coolant will be directed towards a network of pipes, which will direct heat towards the rear of rack 500. At the rear of rack 500 heat carried by the coolant away from the OSFP modules can be removed from the coolant through a liquid to air heat exchanger, such as intercooler 510. Intercooler 510 can be made of a material with a high amount of thermal conductivity and be designed with a large surface area to remove the highest amount of heat possible from the intercooler. Additionally, to help maintain airflow through the rack 500, fans can be included at the back side of rack 500.

FIG. 5B illustrates a top-down view of a rack which can house several OSFP modules. Rack 530 can be similar to rack 500. Rack 530 has a plurality of heat exchangers which correspond to OSFP modules. For example, heat exchanger 530 corresponds to four OSFP modules. Heat exchanger 532 corresponds to a single OSFP module. The heat exchangers can contain a suitable liquid coolant which can absorb heat generated from an OSFP. The liquid coolant will be directed towards a network of pipes, which will extend through the front of the rack and be connected with an external coolant distribution unit (CDU), such as CDU 540. CDU 540 can be chosen based on size and thermal requirements of the OSFP system or rack. For example, CDU systems which provide upwards of 200 kW of cooling in less than 1 $m^2$ of space can be chosen for certain OSFP applications where a greater amount of heat is likely to be generated.

Figure 5C:
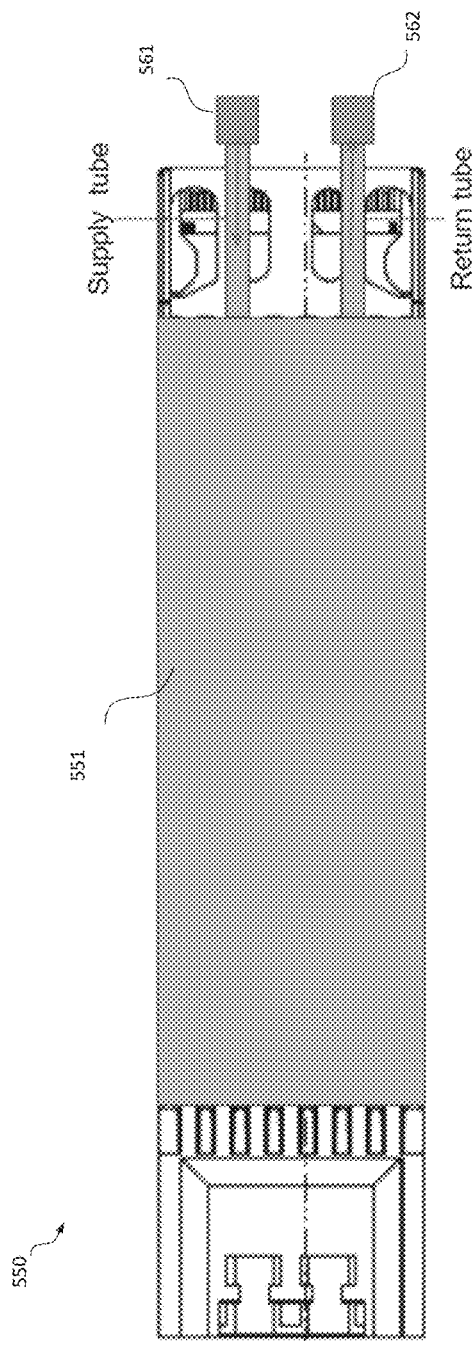
Figure 5D:
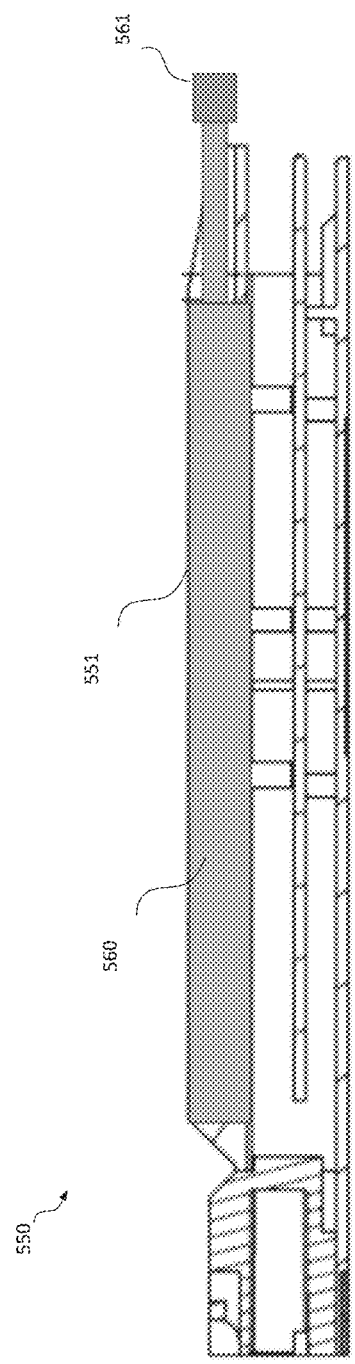

FIGS. 5C and 5D illustrate a top-down view and a side view of an OSFP module 550 with direct water cooling. Module 550, similar to the modules described above, has a front side which can receive a connector and a back side. The module also has a top surface, surface 551. The module can also contain a cold plate, such as cold plate 560. The cold plate can be a reservoir capable of holding liquid. In other examples, cold plate 560 can be a network of pipes of a single pipe running the length of module 550 several times or looped within module 550. In some examples, the cold plate can be collected around a hot spot on module 550. The back side of module 550 can contain an input for cooler water, input port 561 and an output for warm water, output port 562 returning from the cold plate 560. Input port 561 can be in fluid communication with cold plate 560, which can in turn be in fluid communication with output port 562. Collectively, this forms a closed loop which can be externally cooled before returning to the interior of module 550. The addition of input port 561 and output port 562 still allows the OSFP form factor to be retained and ensures compatibility with existing OSFP racks. Input port 561 and output 562 can be made of thermally conductive material with low coefficients of thermal expansion and can be approximately between 1 mm and 5 cm. In addition, the ports can be capable of supporting any suitable flow and pressure depending on cooling requirements.

Figure 6A:
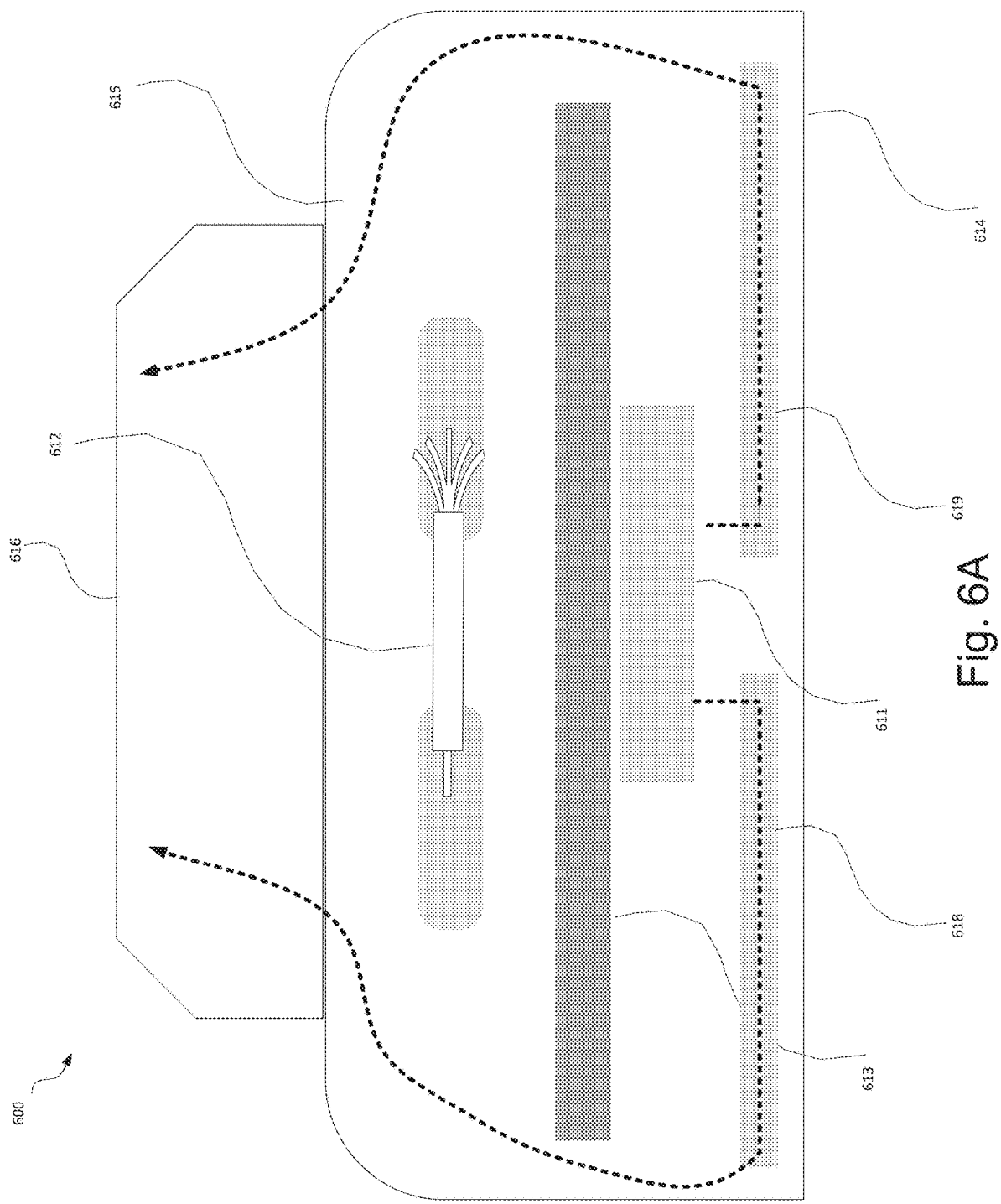
FIGS. 6A-6C are side views of example OSFP modules with improvements to heat dissipation made based on heat paths through the use of flat heat pipes according to aspects of this disclosure.

FIG. 6A illustrates a schematic cross-sectional view of an OSFP module 600. Module 600 can be similar to module 400 and its components. FIG. 6A illustrates an ASIC 611, a laser 612, a printed circuit board 613, and a housing of the OSFP module, housing 614, a thermal path 615, and a heatsink 616. The ASIC is an application specific integrated circuit. ASIC 611 is mounted to the bottom of the module. Additionally, OSFP module 600 can contain flat heat pipes which are integrated towards the bottom of the module 600, such as heatpipes 618 and 619. These flat heat pipes can be made of a highly conductive material. Keeping the heat pipes relatively flat can allow the OSFP module specifications to be maintained.

Figure 6B:
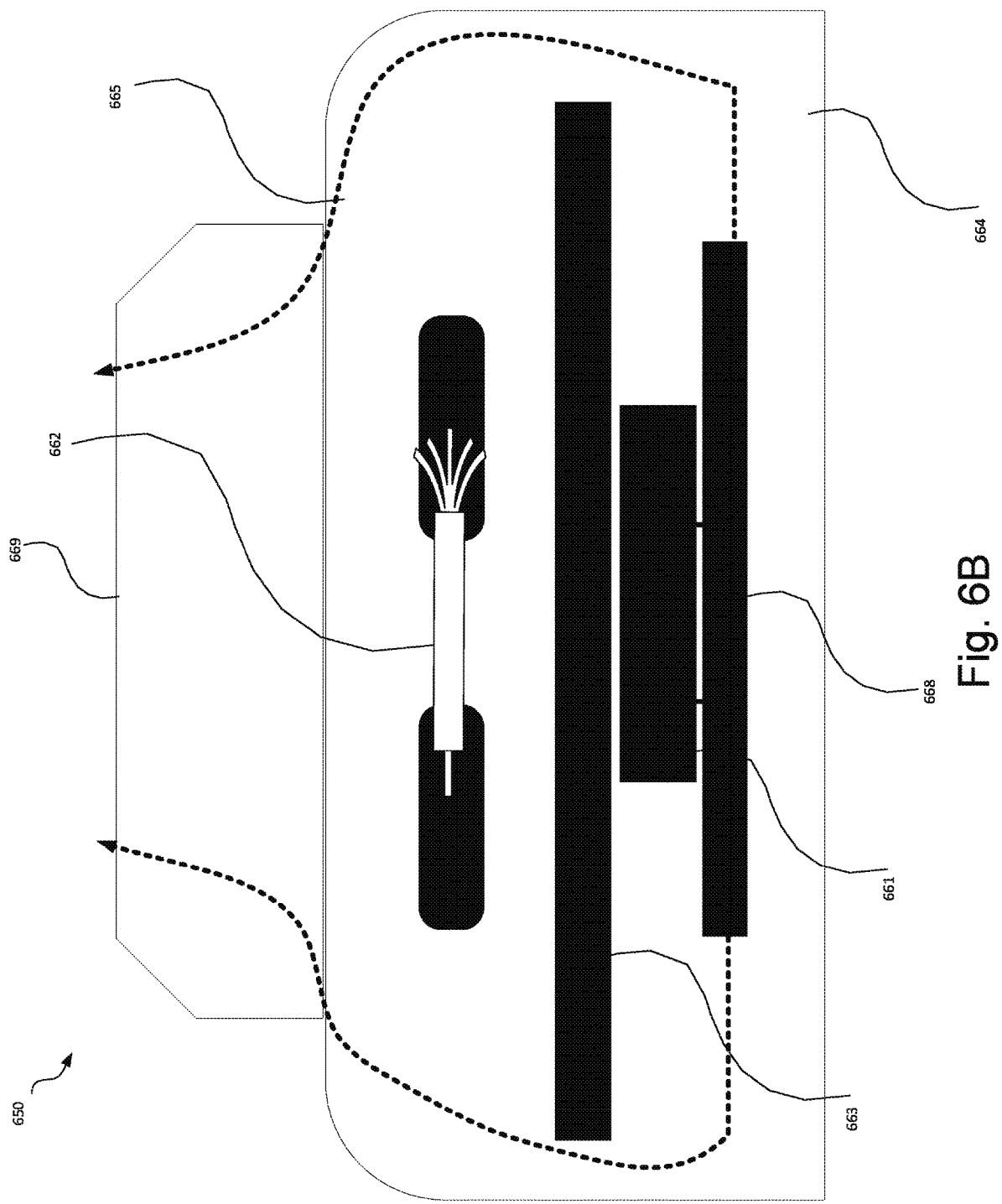

FIG. 6B illustrates a schematic cross-sectional view of an OSFP module 650. Module 650 can be similar to module 400 and its components. FIG. 6B illustrates an ASIC 611, a laser 662, a printed circuit board 663, and a housing of the OSFP module, housing 664, a thermal path 665, and a heatsink 669. The ASIC is an application specific integrated circuit. ASIC 661 is mounted to the bottom of the module. Additionally, OSFP module 600 can contain flat heat pipes which are integrated towards the bottom of the module 600, such as heatpipes 668. These flat heat pipes can be made of a highly conductive material. Keeping the heat pipes relatively flat will allow the OSFP module specifications to be maintained while still allowing for improved cooling. In addition, cooling fins can be added to the bottom of the module to provide additional cooling. In some examples, housing 664 can be indented or otherwise modified to allow space for additional cooling fins to be incorporated without affecting the dimensions of module 650 or preventing it from being integrated within a rack.

Figure 6C:
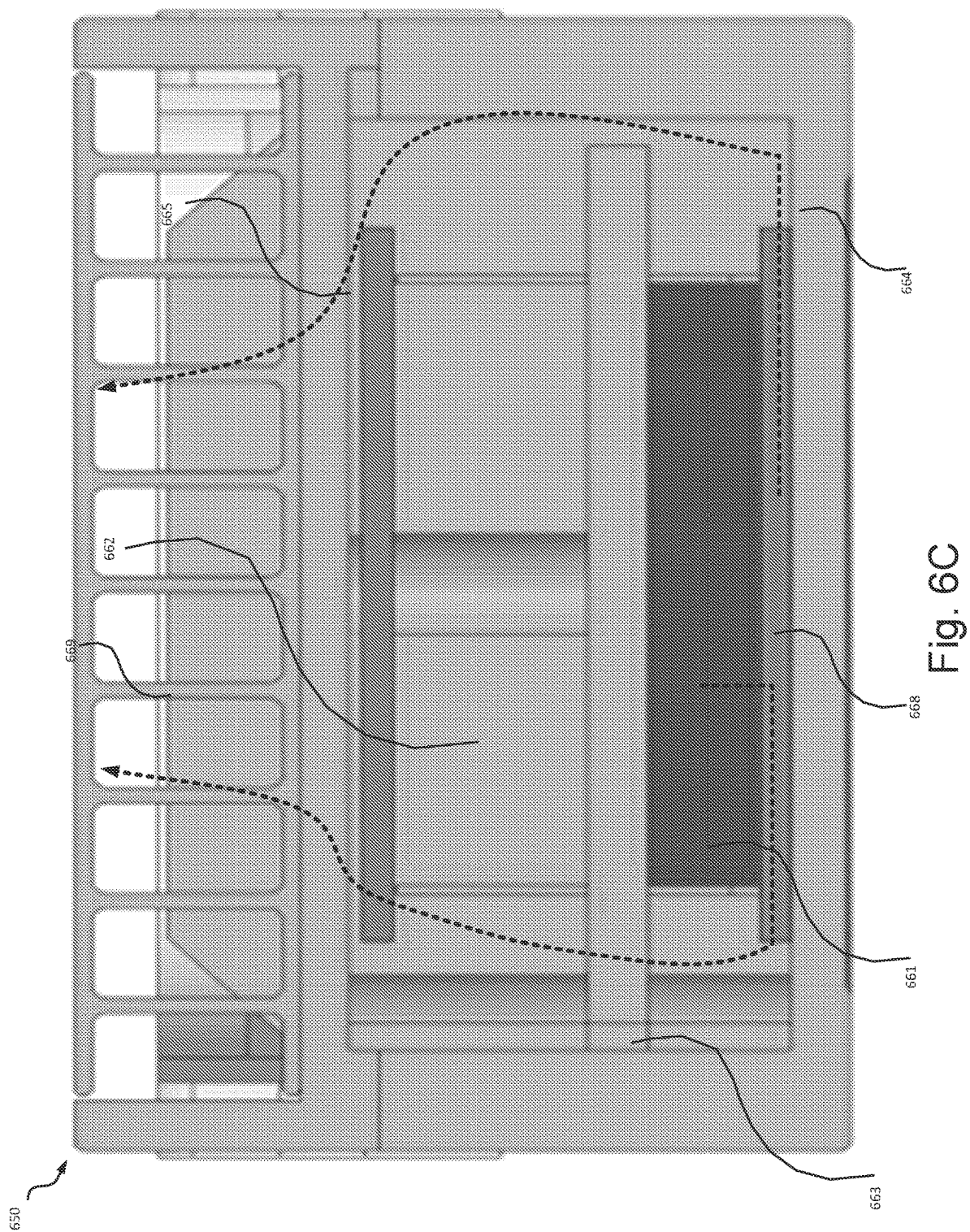

FIG. 6C is another side view of an OSFP module 650 with similar features as described with reference to FIG. 6B.

Figure 7:
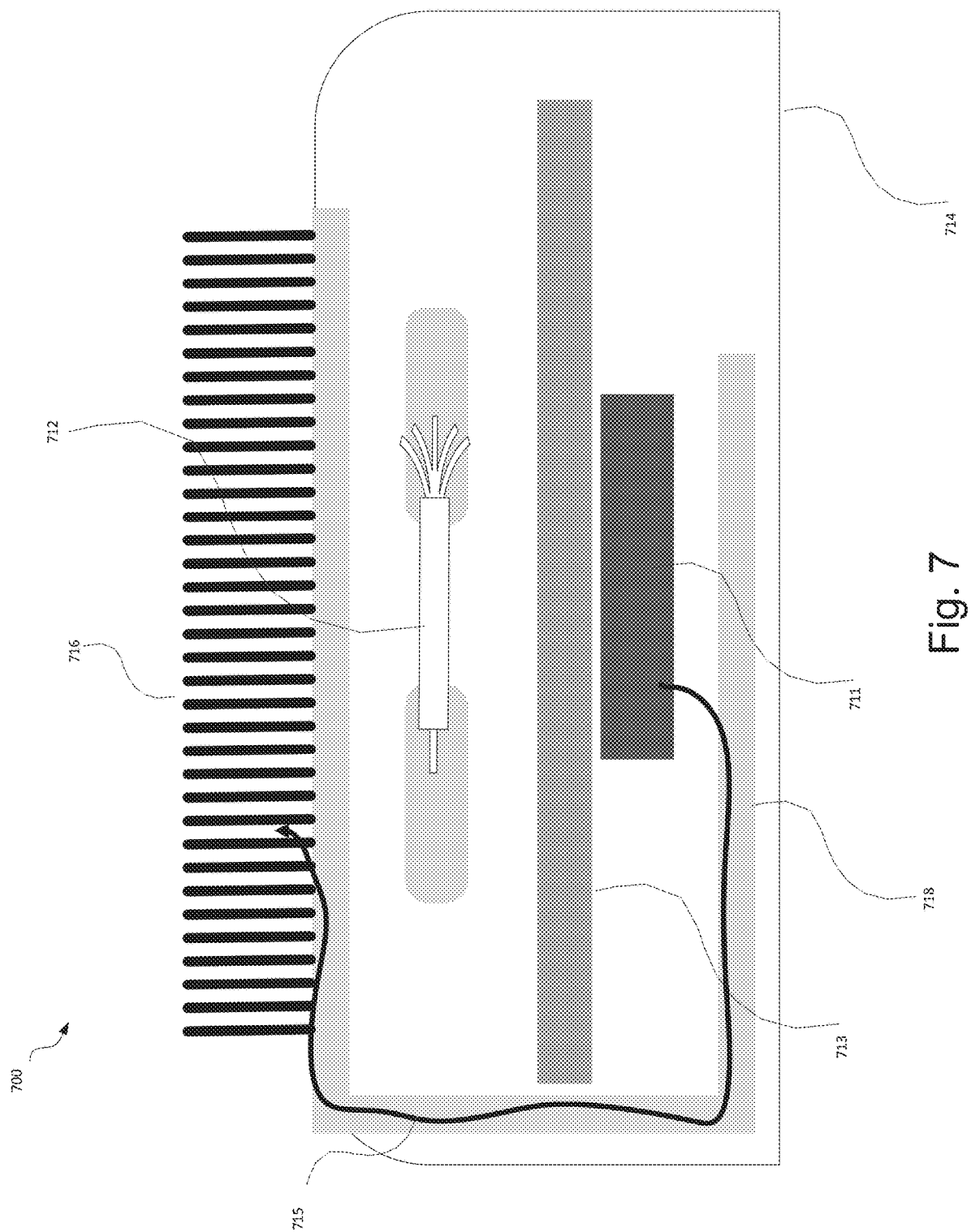
FIG. 7 is a side view of example OSFP module and improvements to heat dissipation through the use of a bend-around heat pipe according to aspects of the disclosure.

FIG. 7 illustrates a schematic cross-sectional view of an OSFP module 700. Module 700 can be similar to module 400 and its components. FIG. 7 illustrates an ASIC 711, a laser 712, a printed circuit board 713, and a housing of the OSFP module, housing 714, a thermal path 715, and fins 716. Fins 716 can also be a heatsink. The ASIC is an application specific integrated circuit. ASIC 711 is mounted to the bottom of the module. Additionally, OSFP module 700 can contain flat heat pipes which are integrated towards the bottom of the module 700, such as heatpipes 718. These flat heat pipes can be made of a highly conductive material. Keeping the heat pipes relatively flat will allow the OSFP module specifications to be maintained. In some examples, heatpipe 718 can be a vapor chamber.

FIGS. 8A-8E illustrate various views of an OSFP module 800.

Figure 8A:
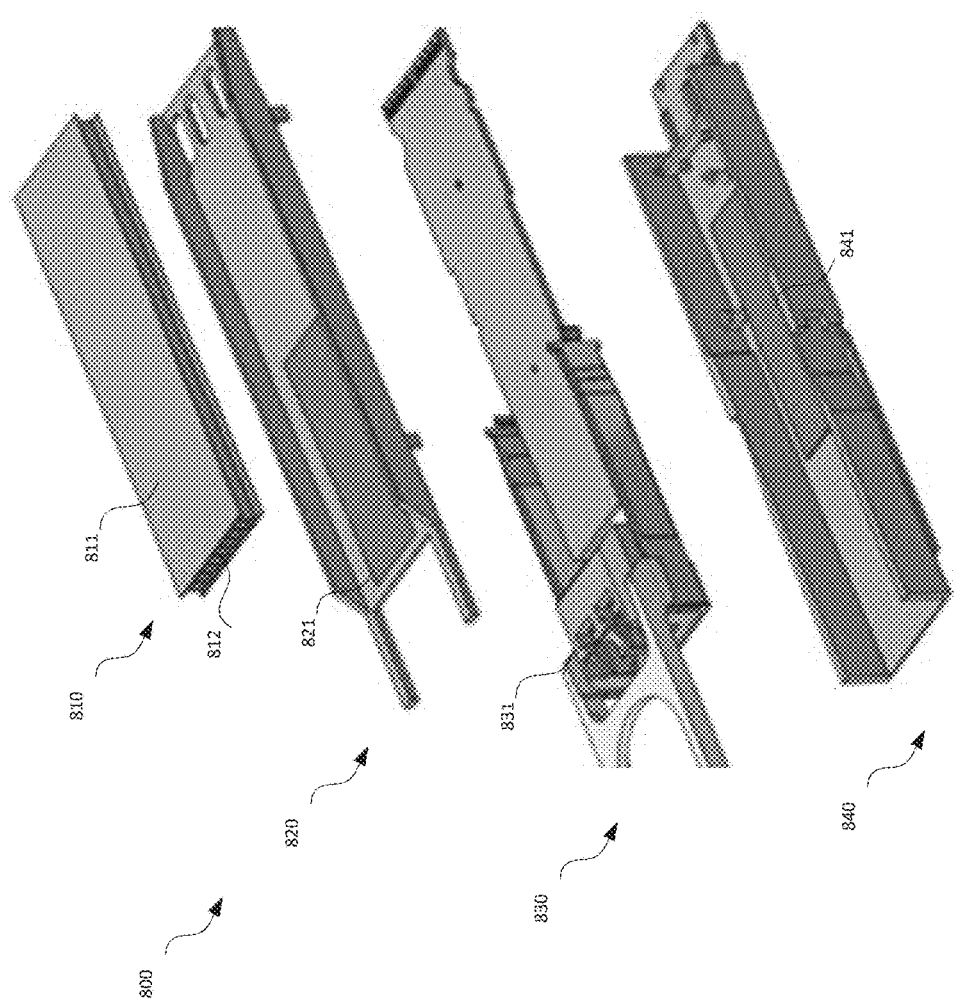
FIGS. 8A-8E are various views of an example OSFP module and improvements made to heat dissipation through the use of an external bottom heat sink, according to aspects of the disclosure.

FIG. 8A illustrates an exploded view of an OSFP compatible module 800. Illustrates is an internal cooling component 810 with a surface 811 and inlets 812. A first middle component 820 contains a heat spreader 821. Heat spreader 821 can be a heat sink, heat pipe, or heat spreader. Heat spreader 821 can be a vapor chamber with an evaporator and condenser. Heat spreader 821 can be made of material with high thermal conductivity or can be made of a material with much higher thermal conductivity as compared to other materials of module 800. For example, heat spreader 821 can be made of a metal or metal compound. Heat spreader 821 can be in thermal contact with cooling component 810. In some examples, heat spreader 821 and cooling component 810 can be one continuous component. In these examples, additional thermal cooling can be realized as the number of thermal interfaces is reduced. Heat spreader 821 can be as thick as a portion of middle component 820 and make thermal contact with a heat source. One side of heat spreader 821 can make thermal contact with cooling component 810 while the opposite side of heat spreader 821 can make contact with a heat source. Second middle component 830 can contain a front side with a data connector 831. In some examples, data connector 831 can contain a layer of a material with low thermal conductivity to prevent a heat source in contact with heat spreader 821 from transmitting or conducting heat towards the bottom of module 800. Middle component 830 can be configured to house electronics, which are sources of heat, such as a laser or an ASIC. Bottom component 840 can contain a heat spreader 841. Heat spreader 841 can be a heatsink or a thermally conductive surface in thermal contact with a heat source, such as electronics, an ASIC, or a laser. In some examples, heat spreader 841 can extend beyond the bottom surface of module 800 and into a larger system. In some examples, heat spreader 841 can form an external heatsink. In some examples, heat spreader 841 can be a vapor chamber. In some examples, heat spreader 841 can contact an external heatsink or cooling component. Heat spreader 821, heat spreader 841, thin vapor chambers, or flat heat pipes can be bonded to the top or bottom of module 800 to improve heat dissipation. In some examples, the exterior contact surface of heat spreader 821 and heat spreader 841, which can be vapor chambers or heat pipes, can be flush to or slightly sub-flush to the exterior surfaces of the module 800.

Figure 8B:
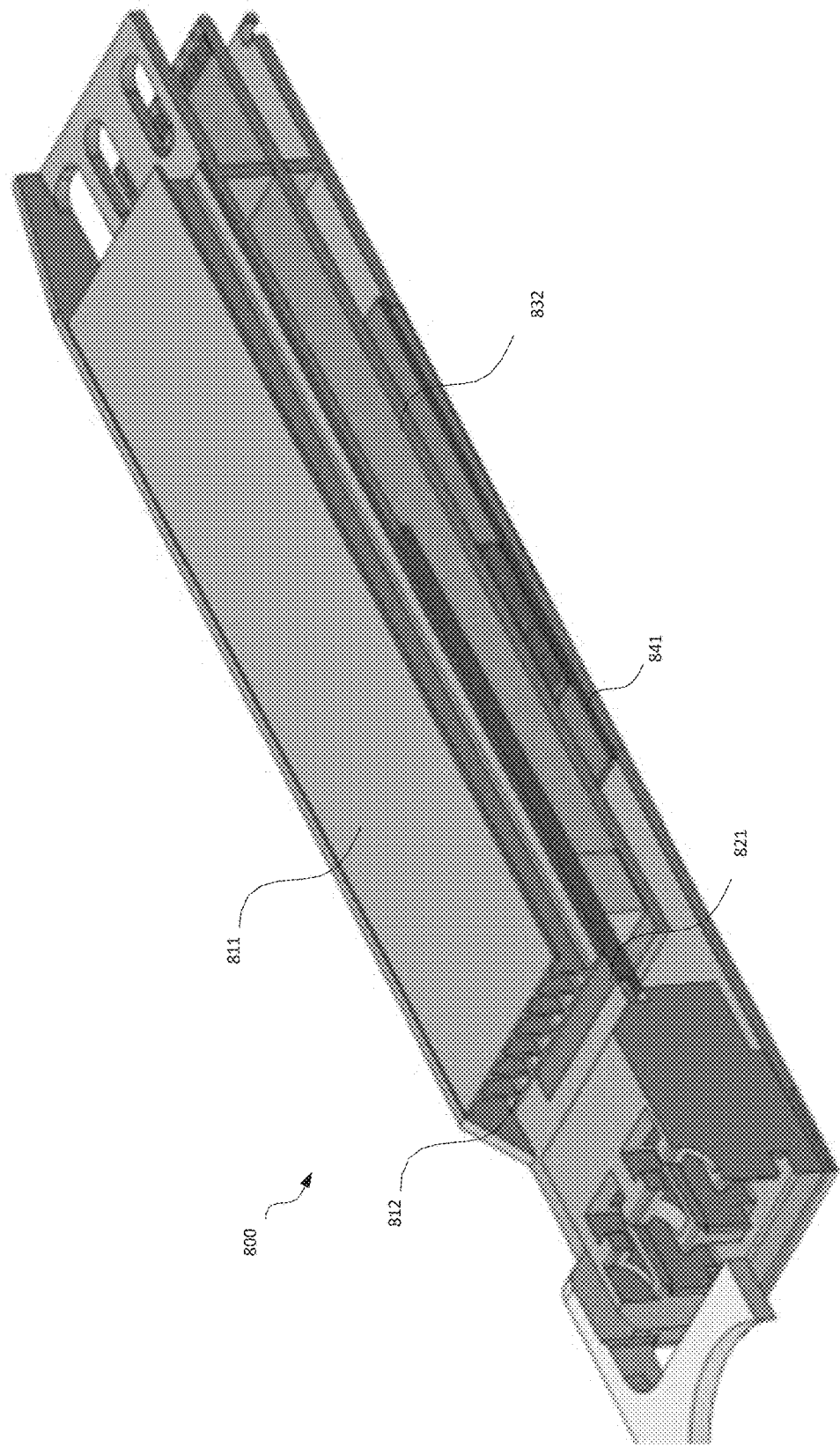

FIG. 8B illustrates a top-down view of assembled OSFP compatible module 800 with surface 811, inlets 812, heat spreader 821, heat spreader 841. Also illustrated in FIG. 8B is a printed circuit board 832. The printed circuit board can interface with electronics inside and external to module 800. In addition, the printed circuit board can be made of materials with low thermal conductivity. In some examples, a laser can be installed in the upper portion of module 800 and be in thermal contact with heat spreader 821 while an ASIC is installed in the lower portion, under the printed circuit board 832, and in thermal contact with heat spreader 841. The laser would be able to dissipate heat through the heat spreader 821 while the ASIC through heat spreader 841. The overall cooling through the module is thus increased in this manner.

Figure 8C:
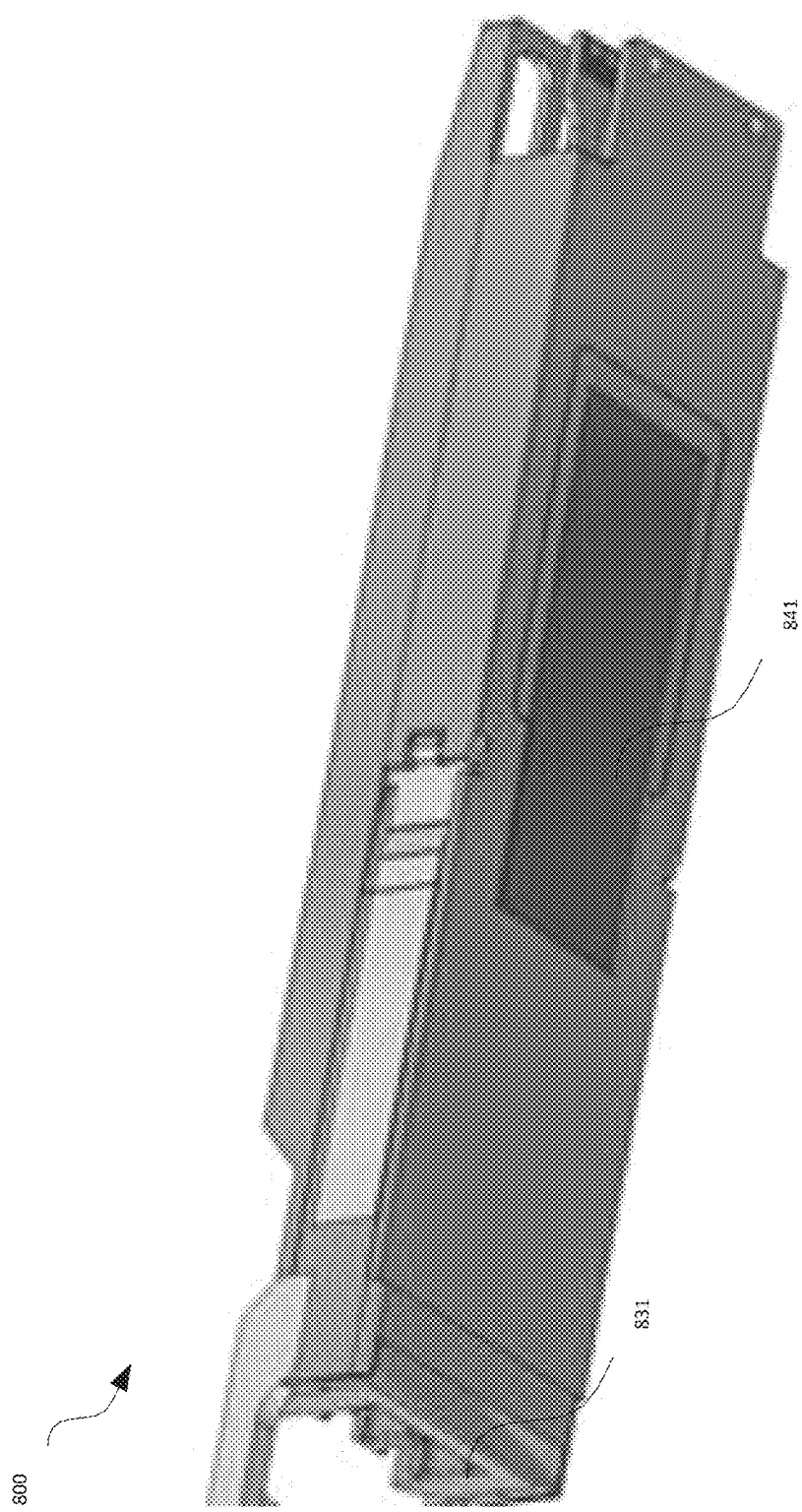

FIG. 8C illustrates a bottom-up view of assembled OSFP compatible module 800 with heat spreader 841 and data connector 831 visible. In some examples, a cut-out can be made in module 800 to allow heat spreader 841 to contact an external heatsink. In other examples, heat spreader 841 can form part of the external surface of module 800 or otherwise be flush with the surface. In some examples, heat spreader 841 can be in contact with an external cooler. In some examples, the external cooler or heatsink can be a liquid heat exchanger, a peltier heat pump, or an additional heat pipe.

Figure 8D:
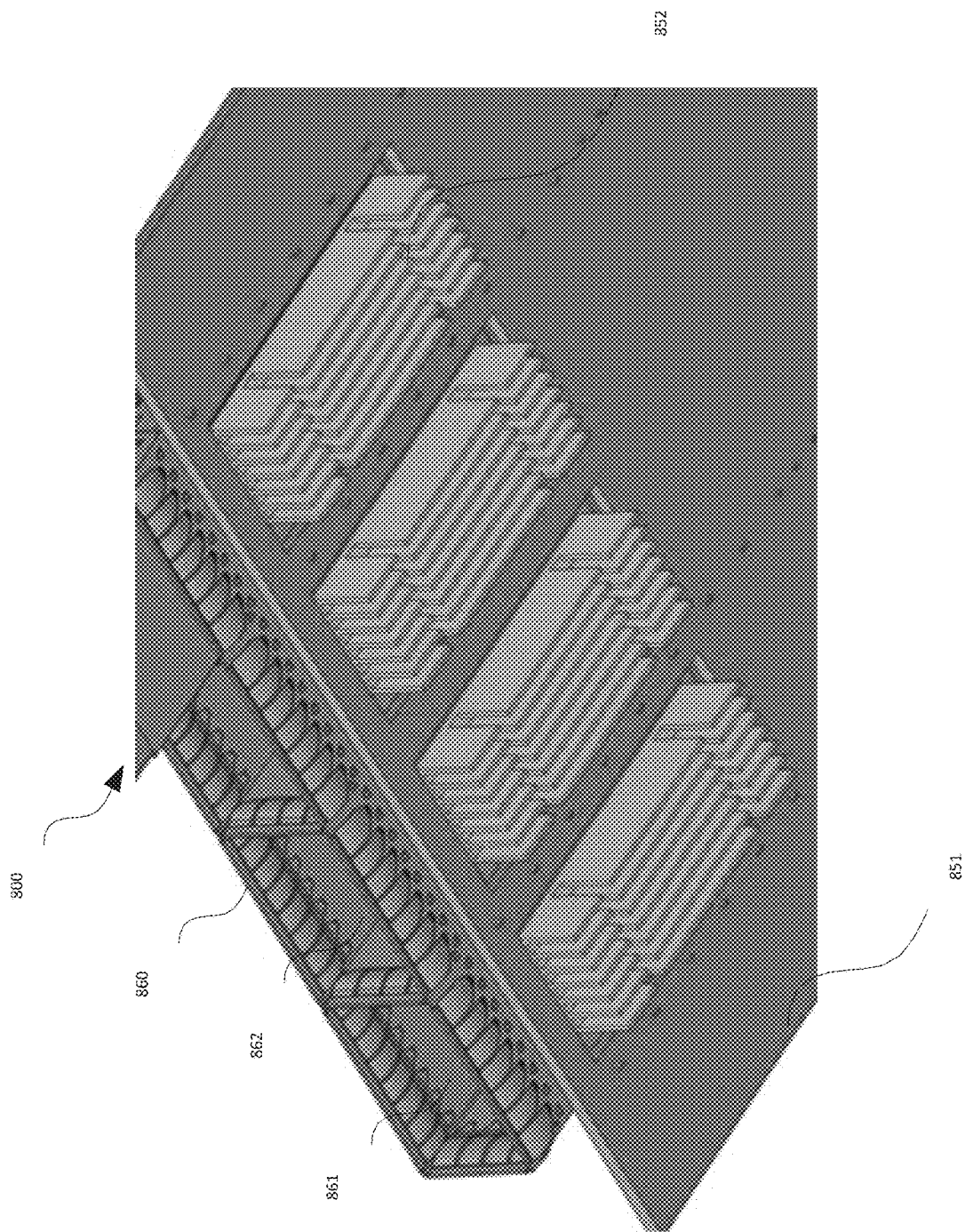

FIG. 8D illustrates module 800 within a cage 860. Cage 860 can be mounted to a printed circuit board 851. Cage 860 can contain several openings, such as opening 861 and 862 to house modules, such as module 800. Printed circuit board 851 can be installed within a larger enclosure. Printed circuit board 851 can interface with electronics within one or more modules. Cage 860 and printed circuit board 851 can be configured to allow a heatsink, heatsink 852, to make thermal contact with module 800 through heat spreader 841 as discussed earlier. For example, the printed circuit board and cage can have cutouts matching the external heat sink. In some examples, cage 860 can be spring loaded to allow for easier compatibility with mechanical matching of components. In other examples, cage 860 can be springless.

Figure 8E:
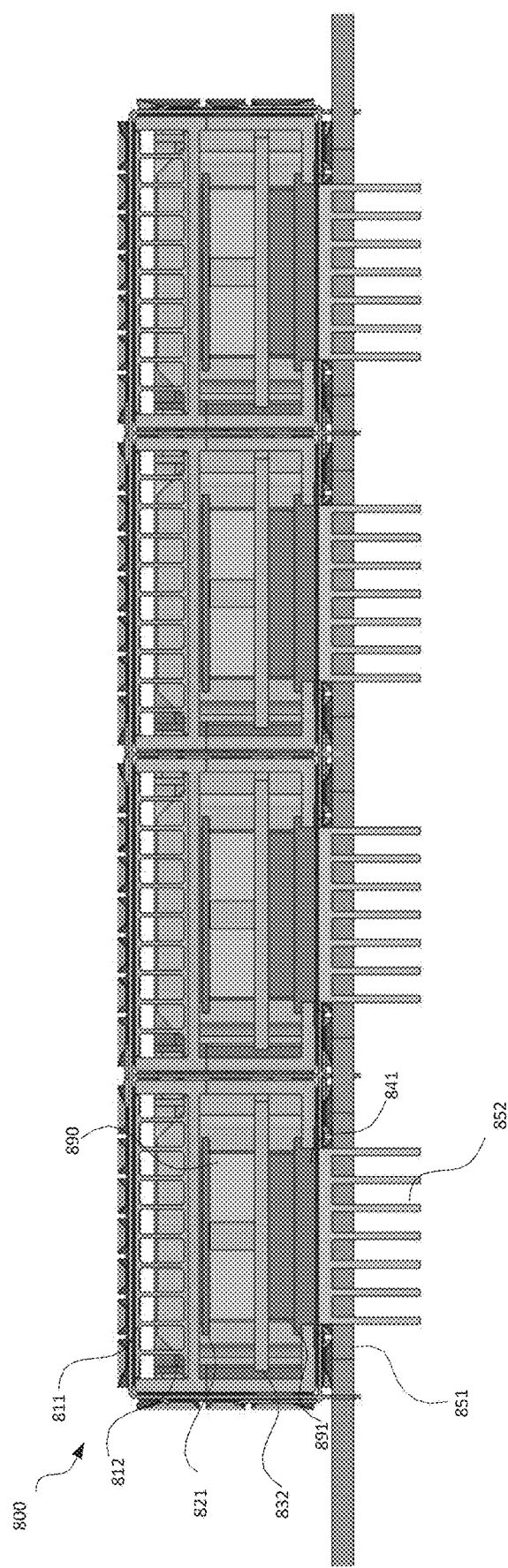

FIG. 8E illustrates a schematic cross-sectional view of module 800, an external heat sink 852, and printed circuit board 851. In addition to the various components discussed with reference to FIGS. 8A-8D, FIG. 8E illustrates a laser 890 and an ASIC 891.

Figure 9:
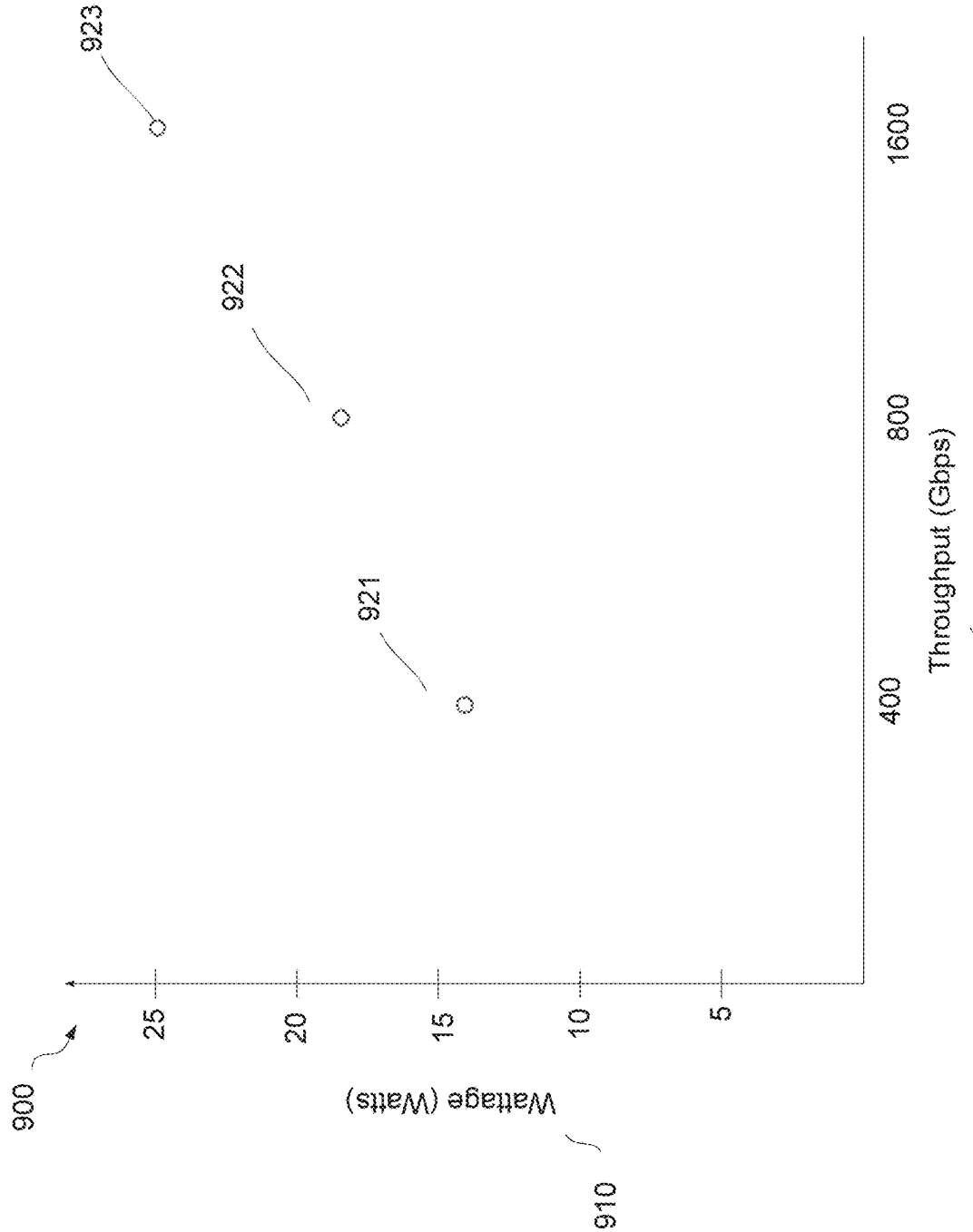
FIG. 9 is a graph illustrating various power and thermal aspects of example OSFP modules at different configurations.

FIG. 9 illustrates thermal and electrical aspects of an example OSFP compliant transceiver module at various operational temperatures. The horizontal axis of the graph 900, axis 905 indicates the throughput of an OSFP module. The vertical axis of graph 900, axis 910, indicates the thermal performance required for a certain throughput.

Three data points are plotted, data points 921-923, corresponding to throughputs of 400 Gbps, 800 Gbps, and 1.6 Tbps respectively. For example, it is expected that an 800 G bitrate will require 19 W of power while a 1.6 T bitrate will require 25 W of power. These latter bitrates cannot be supported with the current OSFP form factor as too much heat is generated for the OSFP module to operate properly. At higher temperatures, the air pressure drop inside the module can be too high to effectively cool the module in ambient and static conditions.

FIG. 10A illustrates a side view of an OSFP module 1000 with one or more of the configurations discussed above with reference to FIGS. 1A-8E. FIG. 10 illustrates an external housing 1010 which can have an inlet 1050. Module 1000 has a front side with an inlet 1040, a back side with a backside or air outlet, outlet 1080, and a top surface 1030 formed between the front side and the back side. Module 1000 can have an external heat sink 1020 attached to the top surface 1030. Module 1000 can also have an internal surface 1041, which as explained above, can in some examples contain holes to allow air to vent into an interior portion of module 1000. Module 1000 can have a surface 1060. In some examples, surface 1060 can be configured to allow an external bottom heatsink to be in contact with surface 1060. Housing 1010 can have a bottom portion, portion 1070. In some examples, portion 1070 can be cut to create an opening for a bottom heatsink.

Figure 10B:
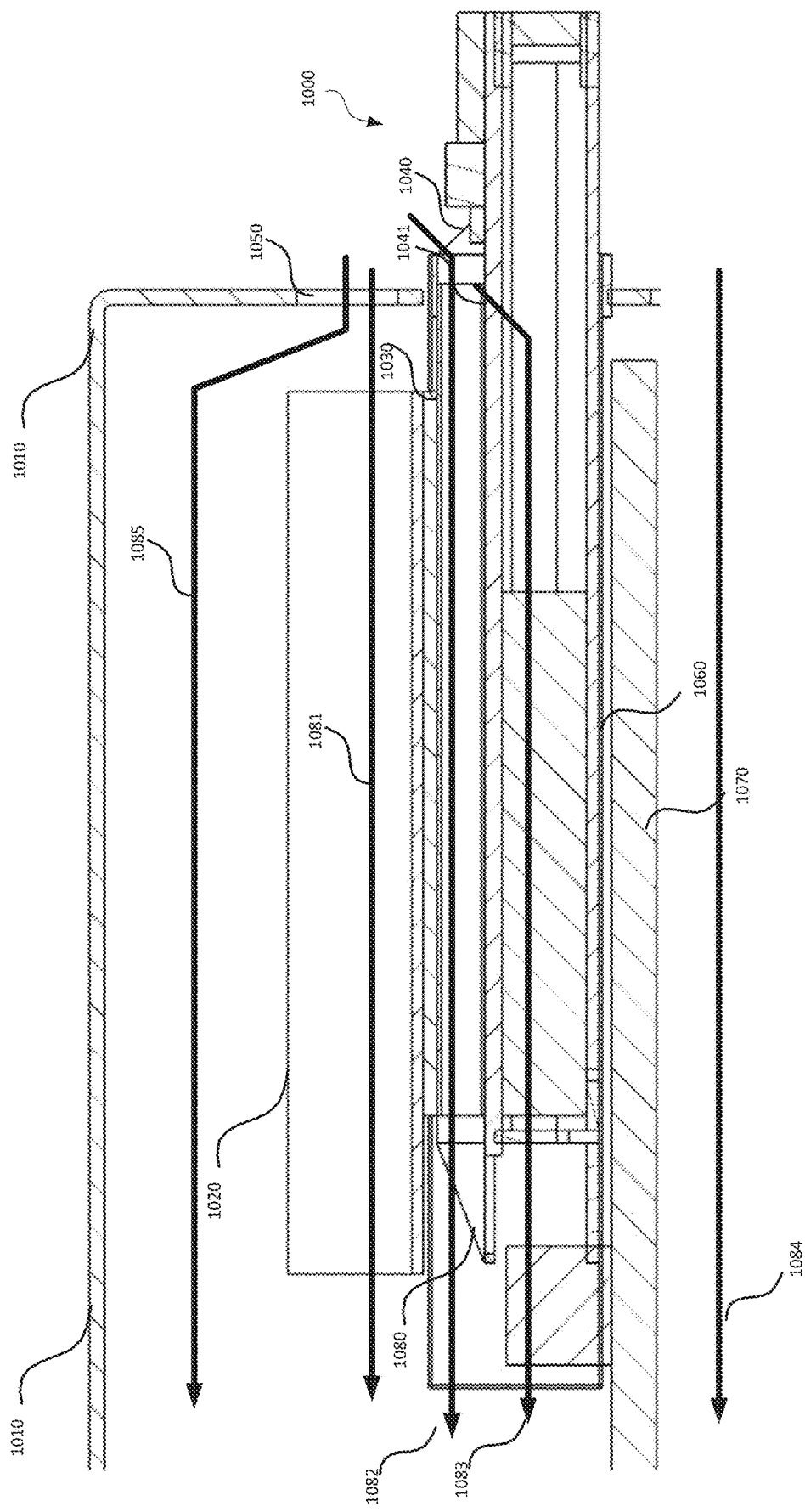
FIG. 10B illustrates example airpaths in a side view of an example OSFP module

FIG. 10B illustrates airpaths in a side view of OSFP module with one or more of the configurations discussed above with reference to FIGS. 1A-8E, airpaths 1081-1085. Airpath 1085 can enter through inlet 1050 of housing 1010 and flow above OSFP module 1000. Airpath 1081 can enter through inlet 1050 of housing 1010 and flow through an external heat sink 1020 which is thermally connected to top surface 1030 of module 1000. Airpath 1082 can enter through inlet 1040, move through the length of the OSFP module 1000, and leave through air outlet 1080. As discussed above, airpath 1082 can encounter pin-foils, such as pin-foil 222. Airpath 1083 can enter through holes within the internal surface, such as hole 212, and move through an internal portion of module 1000 before exiting through the back end. Airpath 1084 can run parallel to the bottom portion of module 1000. Airpath 1084 can cross an external heatsink attached to the bottom of the module to provide additional cooling.

While this disclosure contains many specific implementation details, these should not be construed as limitations on the scope of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Aspects of the technology may include an assembly comprising:

an octal small form factor pluggable (OSFP) module comprising a data connector and inlet apertures configured enable airflow between an interior portion and an exterior portion of the OSFP module;

a first heatsink having a top surface and an opposed bottom surface facing toward the OSFP module; a first plurality of hollow channels formed between the OSFP module and the bottom surface;

a second heatsink having a surface overlying the top surface of the first heatsink and thermally connected with the top surface; and/or a plurality of fins extending away from the surface of the second heatsink; and/or wherein a first space between at least a first pair of two adjacent fins of the plurality of fins differs from a second space between a second pair of adjacent fins, so as to optimize a thermal performance characteristic of the module; and/or wherein the second heatsink contacts the top surface; and/or a housing for receiving the OSFP module therein and positioned between the second heatsink and the surface; and/or wherein the housing includes an opening through which the OSFP module and the second heatsink are thermally interconnected; and/or wherein at least part of the module is comprised of a diamond composite material; and/or wherein the diamond composite material is aluminum diamond; and/or wherein at least part of the module is made of a metal composite material; and/or containing an external or internal water cooling element; and/or containing a vapor chamber; and/or containing a bottom heat sink.

Aspects of the disclosed technology can include any combination of the following features:

¶1. An assembly comprising:

an octal small form factor pluggable (OSFP) module comprising a data connector and inlet apertures configured enable airflow between an interior portion and an exterior portion of the OSFP module;

a first heatsink having a top surface and an opposed bottom surface facing toward the OSFP module;

a first plurality of hollow channels formed between the OSFP module and the bottom surface;

a second heatsink having a surface overlying the top surface of the first heatsink and thermally connected with the top surface; and a plurality of fins extending away from the surface of the second heatsink.

¶2. The assembly of ¶1, wherein a first space between at least a first pair of two adjacent fins of the plurality of fins differs from a second space between a second pair of adjacent fins, so as to optimize a thermal performance characteristic of the module.

¶3. The assembly of ¶¶1-2, wherein the second heatsink contacts the top surface.

¶4. The assembly of ¶1-3, further comprising a housing for receiving the OSFP module therein and positioned between the second heatsink and the surface.

¶5. The assembly of ¶¶1-4, wherein the housing includes an opening through which the OSFP module and the second heatsink are thermally interconnected.

¶6. The assembly of ¶¶1-4, wherein at least part of the module is comprised of a diamond composite material.

¶7. The assembly of ¶¶1-6, wherein the diamond composite material is aluminum diamond.

8. The assembly of ¶¶1-6 wherein at least part of the module is made of a metal composite material.

¶9. A system comprising:
an outer housing having an opening; and
the assembly of ¶1 disposed within the outer housing, wherein the plurality of fins are configured to receive airflow from the opening.

¶10. A system comprising:
an Octal Small Formfactor Pluggable (OSFP) module, the module comprising:
a front side and a back side opposite the front side;
a substantially continuous top surface extending from a portion of the front side to a portion of the back side;
a data connector formed on the front side;
an air duct with a first end and a second end, the first end of the air duct forming a closed connection with the back side of the module;
a blower, with a first end and an exhaust, the first end of the blower forming a closed connection with the second end of the air duct; and
an airpath formed from the front side of the module to the exhaust end of the blower through at least the air duct.

¶11. The system of ¶10 further comprising the air duct formed from a metal composite material.

¶12. The system of ¶¶10-12 wherein the relative dimensions of the air duct based on an air-pressure or an air-speed at the back side of the module.

¶13. The system of ¶¶10-12 wherein the geometry of the air duct is arranged to prevent the formation of vortices within the system.

¶14. The system of ¶¶10-13 wherein a frequency of the blower is based on the geometry of the module.

¶15. The system of ¶¶10-13 wherein a frequency of the blower is based on the air-pressure or air-speed at the back side of the module.

¶16. The system of ¶¶10-15 wherein the airpath is optimized for heat dissipation from the module and/or the system is connected or thermally coupled to a water source and/or the module contains a vapor chamber.

¶17. An Octal Small Formfactor Pluggable (OSFP) module, comprising:
a front side and a back side opposite the front side;
a substantially continuous top surface extending from a portion of the front side to a portion of the back side;
a data connector disposed formed on the front side; and
a plurality of pin-fins formed in an array across the top surface, each pin-fins substantially non-linear in shape and enclosing an area formed by a closed loop on the top surface, wherein the plurality of pin-fins minimize a pressure gradient between the front side and the back side of the module.

¶18. The module of ¶17 wherein each pin-fin is formed in a diamond shape.

¶19. The module of ¶¶17-18 wherein the front side contains substantially open air channels above the data connector.

¶20. The module of ¶¶17-19 wherein the plurality of pin-fins are arranged in rows, the rows offset from one another.

¶21. The module of ¶19 wherein the plurality of pin-fins cover at least 30% of the surface area of the top surface.

¶22. The module of ¶¶17-19 wherein each pin-fin forms an air-foil, the air-foil providing a path for fluid to move across the top surface.

¶23. The module of ¶¶17-20 wherein the air-foil is configured to align with a spring-loaded chamfer formed in a housing for the module.

¶24. The module of ¶23 wherein the plurality of pin-fins are configured to attenuate electro-magnetic interference.

¶25. The module of ¶23 wherein the plurality of pin-fins are configured to attenuate radiation emitted from the front side of the module.

¶26. The module of ¶17 wherein the module is connected or thermally coupled to a water source and/or a bottom heat sink and/or a vapor chamber and/or an inlet and/or aperture and/or a blower.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

The invention claimed is:

1. An octal small form factor pluggable (OSFP) module comprising:
a heat sink;
an application specific integrated circuit (ASIC);
a printed circuit board (PCB) between the heat sink and the ASIC;
a laser between the PCB and the heat sink; and
a heat pipe on an opposite side of the PCB from the heat sink.

2. The OSFP module of claim 1, wherein the heat pipe is on an opposite side of the ASIC from the PCB.

3. The OSFP module of claim 1, wherein the heat pipe is a first heat pipe and comprising a second heat pipe on the opposite side of the ASIC from the PCB.

4. The OSFP module of claim 3, wherein:
the PCB includes opposed edges that lie on a first plane and are spaced apart by a first distance;
the first heat pipe includes a first end that lies on a second plane that is parallel to the first plane; and
the second heat pipe includes a second end that lies on the second plane and is spaced from the first end by a second distance that is greater than the first distance.

5. The OSFP module of claim 1, wherein:
the PCB extends on a first plane and has a first width on the first plane; and
the heat pipe extends on a second plane parallel to the first plane and has a second with on the second plane, wherein the second width equals the first width.

6. The OSFP module of claim 1, wherein:
the PCB extends on a first plane and has a first width on the first plane; and
the heat pipe extends on a second plane parallel to the first plane and has a second with on the second plane, wherein the second width is less than the first width.

7. The OSFP module of claim 1, wherein the heat pipe is a flat heat pipe.

8. The OSFP module of claim 1, wherein the heat pipe is a vapor chamber.

9. The OSFP module of claim 1, comprising cooling fins on an opposite side of the module from the heat sink.

10. The OSFP module of claim 9, comprising a housing having an indentation in which the additional cooling fins are located.

11. An OSFP module comprising:
a heat sink;
an ASIC;
a PCB between the heat sink and the ASIC;
a laser between the PCB and the heat sink; and
heat pipes extending from a first location on a same side of the PCB as the ASIC to a second location on a same side of the PCB as the heat sink.

12. The OSFP module of claim 11, wherein the ASIC is between the first location and the PCB.

13. The OSFP module of claim 11, wherein the laser is between the second location and the PCB.

14. The OSFP module of claim 11, wherein the heat pipes bend around the PCB.

15. An OSFP module comprising:
a heat sink;
an ASIC;
a PCB between the heat sink and the ASIC;
a laser between the PCB and the heat sink; and
a heat pipe defining a portion of a thermal path extending around the PCB from the ASIC to the heat sink.

16. The OSFP module of claim 15, wherein the heat pipe is a first heat pipe among a plurality of heat pipes defining the thermal path.

17. The OSFP module of claim 16, wherein the plurality of heat pipes extends to the heat sink from a location on a same side of the PCB as the ASIC.

18. The OSFP module of claim 16, wherein the plurality of heat pipes bends around the PCB.

19. The OSFP module of claim 15, wherein the thermal path is a first thermal path and the heat pipe defines a portion of a second thermal path extending from the ASIC to the heat sink around an opposite edge of the PCB from the first thermal path.

20. The OSFP module of claim 15, wherein the heat pipe is a first heat pipe and the thermal path is a first heat path, and comprising a second heat pipe defining a portion of a second thermal path extending from the ASIC to the heat sink around an opposite edge of the PCB from the first thermal path.

* * * * *